United States Patent
Rajamanickam et al.

(10) Patent No.: US 8,315,269 B1
(45) Date of Patent: Nov. 20, 2012

(54) DEVICE, METHOD, AND PROTOCOL FOR DATA TRANSFER BETWEEN HOST DEVICE AND DEVICE HAVING STORAGE INTERFACE

(75) Inventors: Jagadeesan Rajamanickam, San Jose, CA (US); Dinesh Maheshwari, Fremont, CA (US); Stephen Henry Kolokowsky, San Diego, CA (US); Pradeep Kumar Bajpai, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 729 days.

(21) Appl. No.: 11/906,033

(22) Filed: Sep. 28, 2007

Related U.S. Application Data

(60) Provisional application No. 60/925,179, filed on Apr. 18, 2007.

(51) Int. Cl.
*H04L 12/28* (2006.01)
*H04L 12/56* (2006.01)
*G06F 15/16* (2006.01)

(52) U.S. Cl. .......................... 370/419; 709/230

(58) Field of Classification Search .................. 370/419, 370/386, 392, 395, 468, 469, 389, 400, 401, 370/216, 242, 224; 709/223, 238, 240, 251, 709/230, 213, 250, 227, 222; 455/554, 555, 455/12, 13, 552; 716/1, 3–6; 345/560, 345, 345/589, 519, 530; 348/571; 711/105, 168; 375/240; 712/220

See application file for complete search history.

(56) References Cited

U.S. PATENT DOCUMENTS

| | | | |
|---|---|---|---|
| 4,641,261 A | 2/1987 | Dwyer et al. |
| 4,701,913 A | 10/1987 | Nelson |
| 4,713,757 A | 12/1987 | Davidson et al. |
| 4,862,355 A | 8/1989 | Newman et al. |
| 4,866,606 A | 9/1989 | Kopetz |
| 4,890,222 A | 12/1989 | Kirk |
| 5,289,580 A | 2/1994 | Latif et al. |
| 5,388,249 A | 2/1995 | Hotta et al. |
| 5,392,421 A | 2/1995 | Lennartsson |

(Continued)

FOREIGN PATENT DOCUMENTS

EP  0987876 A2  1/1999

(Continued)

OTHER PUBLICATIONS

Compaq Computer Corporation et al., *Universal Serial Bus Specification—Rev 2.0*, Apr. 27, 2000, pp. ii, 18-19, 33-34, 120, 145, 196-207, 227-228.

(Continued)

*Primary Examiner* — Hassan Phillips
*Assistant Examiner* — Prenell P Jones

(57) ABSTRACT

A system for transferring data files between a host device and a secondary device can include a bridge device forming at least a portion of the secondary device. The bridge device can have a de-multiplex (de-MUX) data path with an input coupled to a host interface (I/F), a first output coupled to a storage I/F and a second output coupled to a processor I/F. A controller circuit can have control inputs coupled to receive configuration commands from the processor I/F and control outputs coupled to control terminals of the de-MUX data path. The controller circuit enables and maintaining a data path between the host I/F and the first output of the de-MUX data path for a predetermined number of data transfers in response to at least a first configuration data input.

20 Claims, 15 Drawing Sheets

U.S. PATENT DOCUMENTS

| | | | |
|---|---|---|---|
| 5,402,394 A | 3/1995 | Turski | |
| 5,416,909 A | 5/1995 | Long et al. | |
| 5,428,748 A | 6/1995 | Davidson et al. | |
| 5,454,080 A | 9/1995 | Fasig et al. | |
| 5,461,723 A | 10/1995 | Shah et al. | |
| 5,488,657 A | 1/1996 | Lynn et al. | |
| 5,497,067 A | 3/1996 | Shaw | |
| 5,574,859 A | 11/1996 | Yeh | |
| 5,577,213 A | 11/1996 | Avery et al. | |
| 5,586,268 A | 12/1996 | Chen et al. | |
| 5,598,409 A | 1/1997 | Madonna et al. | |
| 5,606,672 A | 2/1997 | Wade | |
| 5,615,344 A | 3/1997 | Corder | |
| 5,621,902 A | 4/1997 | Cases et al. | |
| 5,628,001 A | 5/1997 | Cepuran | |
| 5,630,147 A | 5/1997 | Datta et al. | |
| 5,634,074 A | 5/1997 | Devon et al. | |
| 5,642,489 A | 6/1997 | Bland et al. | |
| 5,655,148 A | 8/1997 | Richman et al. | |
| 5,671,355 A | 9/1997 | Collins | |
| 5,673,031 A | 9/1997 | Meier | |
| 5,675,813 A | 10/1997 | Holmdahl | |
| 5,687,346 A | 11/1997 | Shinohara | |
| 5,701,429 A | 12/1997 | Legvold et al. | |
| 5,748,911 A | 5/1998 | Maguire et al. | |
| 5,748,923 A | 5/1998 | Eitrich | |
| 5,754,799 A | 5/1998 | Hiles | |
| 5,758,188 A | 5/1998 | Appelbaum et al. | |
| 5,767,844 A | 6/1998 | Stoye | |
| 5,774,744 A | 6/1998 | Story et al. | |
| 5,778,218 A | 7/1998 | Gulick | |
| 5,781,028 A | 7/1998 | Decuir | |
| 5,793,745 A * | 8/1998 | Manchester | 370/224 |
| 5,794,033 A | 8/1998 | Aldebert et al. | |
| 5,802,328 A | 9/1998 | Yoshimura | |
| 5,802,558 A | 9/1998 | Pierce | |
| 5,805,834 A | 9/1998 | McKinley et al. | |
| 5,828,854 A | 10/1998 | Wade | |
| 5,838,907 A | 11/1998 | Hansen | |
| 5,859,988 A | 1/1999 | Ajanovic et al. | |
| 5,862,362 A | 1/1999 | Somasegar et al. | |
| 5,898,861 A | 4/1999 | Emerson et al. | |
| 5,974,486 A | 10/1999 | Siddappa | |
| 5,982,879 A | 11/1999 | Lucey | |
| 6,009,480 A | 12/1999 | Pleso | |
| 6,012,103 A | 1/2000 | Sartore et al. | |
| 6,012,115 A | 1/2000 | Chambers et al. | |
| 6,038,667 A | 3/2000 | Helbig, Sr. | |
| 6,049,870 A | 4/2000 | Greaves | |
| 6,049,885 A | 4/2000 | Gibson et al. | |
| 6,067,628 A | 5/2000 | Krithivas et al. | |
| 6,085,325 A | 7/2000 | Jackson et al. | |
| 6,085,328 A | 7/2000 | Klein et al. | |
| 6,122,676 A | 9/2000 | Brief et al. | |
| 6,125,420 A | 9/2000 | Eidson | |
| 6,145,045 A | 11/2000 | Falik et al. | |
| 6,148,354 A | 11/2000 | Ban et al. | |
| 6,173,355 B1 | 1/2001 | Falik et al. | |
| 6,175,883 B1 | 1/2001 | Kvamme et al. | |
| 6,189,060 B1 | 2/2001 | Kodama | |
| 6,199,122 B1 | 3/2001 | Kobayashi | |
| 6,212,165 B1 | 4/2001 | Mann et al. | |
| 6,226,291 B1 | 5/2001 | Chauvel et al. | |
| 6,233,640 B1 | 5/2001 | Luke et al. | |
| 6,249,825 B1 | 6/2001 | Sartore et al. | |
| 6,272,644 B1 | 8/2001 | Urade et al. | |
| 6,275,499 B1 * | 8/2001 | Wynn et al. | 370/438 |
| 6,279,060 B1 | 8/2001 | Luke et al. | |
| 6,292,863 B1 | 9/2001 | Terasaki et al. | |
| 6,311,294 B1 | 10/2001 | Larky et al. | |
| 6,366,980 B1 | 4/2002 | Haines et al. | |
| 6,389,495 B1 | 5/2002 | Larky et al. | |
| 6,415,343 B1 | 7/2002 | Fensore et al. | |
| 6,493,770 B1 | 12/2002 | Sartore et al. | |
| 6,505,267 B2 | 1/2003 | Luke et al. | |
| 6,513,128 B1 | 1/2003 | Wang et al. | |
| 6,529,988 B1 | 3/2003 | Yoshikawa et al. | |
| 6,532,525 B1 * | 3/2003 | Aleksic et al. | 711/168 |
| 6,564,349 B1 * | 5/2003 | Mitten et al. | 714/733 |
| 6,601,118 B1 | 7/2003 | Rooney | |
| 6,615,306 B1 | 9/2003 | Ajanovic | |
| 6,618,788 B1 | 9/2003 | Jacobs | |
| 6,622,195 B2 | 9/2003 | Osakada et al. | |
| 6,622,251 B1 | 9/2003 | Lindskog et al. | |
| 6,625,687 B1 * | 9/2003 | Halbert et al. | 711/105 |
| 6,633,537 B1 * | 10/2003 | Shimizu | 370/216 |
| 6,633,933 B1 | 10/2003 | Smith et al. | |
| 6,633,944 B1 | 10/2003 | Holm et al. | |
| 6,678,761 B2 | 1/2004 | Garney et al. | |
| 6,684,272 B1 | 1/2004 | Leete et al. | |
| 6,697,906 B1 | 2/2004 | Ayukawa et al. | |
| 6,718,412 B2 | 4/2004 | Purcell et al. | |
| 6,760,852 B1 | 7/2004 | Gulick | |
| 6,816,929 B2 | 11/2004 | Ueda | |
| 6,816,976 B2 | 11/2004 | Wright et al. | |
| 6,934,793 B2 | 8/2005 | Ying et al. | |
| 6,938,108 B2 | 8/2005 | Ohie et al. | |
| 6,970,419 B1 | 11/2005 | Kalkunte et al. | |
| 7,007,112 B2 | 2/2006 | Ishida et al. | |
| 7,010,638 B2 | 3/2006 | Deng et al. | |
| 7,054,980 B2 | 5/2006 | Wurzburg | |
| 7,062,618 B2 | 6/2006 | Tsunoda et al. | |
| 7,073,008 B2 | 7/2006 | Wu et al. | |
| 7,073,010 B2 | 7/2006 | Chen et al. | |
| 7,076,568 B2 | 7/2006 | Philbrick et al. | |
| 7,080,189 B1 | 7/2006 | Luttmann | |
| 7,082,545 B2 | 7/2006 | Kubo et al. | |
| 7,110,006 B2 | 9/2006 | MacInnis et al. | |
| 7,127,546 B2 | 10/2006 | Ying et al. | |
| 7,143,227 B2 | 11/2006 | Maine | |
| 7,162,565 B1 | 1/2007 | Kolokowsky et al. | |
| 7,162,566 B2 | 1/2007 | Lin | |
| 7,187,946 B2 | 3/2007 | Palan | |
| 7,213,096 B2 | 5/2007 | Keys et al | |
| 7,231,485 B2 | 6/2007 | Harris et al. | |
| 7,231,653 B2 | 6/2007 | Jutzi | |
| 7,394,471 B2 | 7/2008 | Chan et al. | |
| 7,478,191 B2 | 1/2009 | Wurzburg et al. | |
| 7,484,031 B2 | 1/2009 | Tjia | |
| 7,523,243 B2 | 4/2009 | Bohm et al. | |
| 7,640,385 B2 | 12/2009 | Ng et al. | |
| 7,644,147 B1 * | 1/2010 | Wohlgemuth et al. | 709/223 |
| 7,730,268 B2 | 6/2010 | Maheshwari et al. | |
| 7,895,387 B1 | 2/2011 | Khodabandehlou | |
| 7,921,244 B2 | 4/2011 | Chang et al. | |
| 8,037,228 B2 | 10/2011 | Maheshwari et al. | |
| 2001/0037406 A1 * | 11/2001 | Philbrick et al. | 709/250 |
| 2002/0040444 A1 | 4/2002 | Ohie et al. | |
| 2002/0156949 A1 | 10/2002 | Kubo et al. | |
| 2003/0028733 A1 * | 2/2003 | Tsunoda et al. | 711/154 |
| 2003/0058933 A1 * | 3/2003 | Jutzi | 375/240.01 |
| 2003/0172223 A1 | 9/2003 | Ying et al. | |
| 2003/0185249 A1 | 10/2003 | Davies et al. | |
| 2003/0202510 A1 * | 10/2003 | Witkowski et al. | 370/386 |
| 2003/0212841 A1 | 11/2003 | Lin | |
| 2004/0003164 A1 | 1/2004 | Boily | |
| 2004/0010612 A1 * | 1/2004 | Pandya | 709/230 |
| 2004/0030766 A1 * | 2/2004 | Witkowski | 709/223 |
| 2004/0181811 A1 * | 9/2004 | Rakib | 725/122 |
| 2005/0033880 A1 | 2/2005 | Lin | |
| 2005/0060490 A1 | 3/2005 | Lu | |
| 2005/0075131 A1 * | 4/2005 | Palan | 455/554.2 |
| 2005/0122335 A1 * | 6/2005 | MacInnis et al. | 345/520 |
| 2005/0157711 A1 * | 7/2005 | O'Dell et al. | 370/386 |
| 2005/0219418 A1 * | 10/2005 | Chan et al. | 348/595 |
| 2006/0036558 A1 | 2/2006 | Mathews | |
| 2006/0056401 A1 | 3/2006 | Bohm et al. | |
| 2006/0059289 A1 | 3/2006 | Ng et al. | |
| 2006/0059293 A1 | 3/2006 | Wurzburg et al. | |
| 2006/0253639 A1 | 11/2006 | Lee et al. | |
| 2007/0079045 A1 | 4/2007 | Luke | |
| 2007/0170268 A1 | 7/2007 | Lee | |
| 2007/0186016 A1 * | 8/2007 | Mennekens et al. | 710/22 |
| 2007/0245057 A1 | 10/2007 | Bohm et al. | |
| 2007/0245058 A1 | 10/2007 | Wurzburg et al. | |
| 2007/0245059 A1 | 10/2007 | Tjia | |
| 2008/0046638 A1 | 2/2008 | Maheshwari et al. | |

| | | | |
|---|---|---|---|
| 2008/0307145 A1* | 12/2008 | Goren et al. | 710/307 |
| 2009/0013103 A1 | 1/2009 | Chang et al. | |
| 2009/0055569 A1 | 2/2009 | Maheshwari et al. | |
| 2009/0187745 A1* | 7/2009 | Hino et al. | 712/220 |

FOREIGN PATENT DOCUMENTS

| | | |
|---|---|---|
| EP | 0890905 A2 | 3/2000 |
| EP | 1111498 A2 | 6/2001 |
| GB | 2352540 A | 1/2001 |
| JP | 404200119 A1 | 7/1992 |
| JP | 410097303 A1 | 4/1998 |
| JP | 410097309 A1 | 4/1998 |

OTHER PUBLICATIONS

Cypress Semiconductor Corporation, *MoBL-USBTM FX2LP18 USB Microcontroller*, 2007.
"USB 2.0 mux interfaces USB, non-USB devices", *EE Times Asia*, May 15, 2007, found on the Internet at http:/www.eetasia.com/ART_8800464295_590626_NP_870689ba.HTM?1000013030&8800464295&click_from=1000013030,8619953561,2007-05-15,EEOL,EENEWS.
Intersil Americas Inc., *ISL54200 Data Sheet FN6408.0*, Jan. 24, 2007.
Axelson, Jan; "USB Complete"; Independent Publishers Group; Third Edition; 2005; 20 pages.
Philips Semiconductors; "PDIUSBBD11 USB device with serial interface"; Philips Semiconductors; Jul. 22, 1999; 21 pages.
U.S. Appl. No. 11/903,271: "Architectures for Supporting Communication and Access Between Multiple Host Devices and One or More Common Functions," Khodabandehlou et al., filed on Sep. 21, 2007; 47 pages.
USPTO Notice of Allowance for U.S. Appl. No. 11/903,271 dated Aug. 12, 2011; 7 pages.
USPTO Notice of Allowance for U.S. Appl. No. 11/903,271 dated Apr. 22, 2011; 7 pages.
USPTO Notice of Allowance for U.S. Appl. No. 11/903,271 dated Jan. 14, 2011; 6 pages.
USPTO Notice of Allowance for U.S. Appl. No. 11/903,271 dated Sep. 30, 2010; 6 pages.
USPTO Notice of Allowance for U.S. Appl. No. 11/903,271 dated May 27, 2010; 4 pages.
USPTO Notice of Allowance for U.S. Appl. No. 11/903,271 dated Feb. 19, 2010; 9 pages.
USPTO Advisory Action for U.S. Appl. No. 11/903,271 dated Jan. 11, 2010; 3 pages.
USPTO Final Rejection for U.S. Appl. No. 11/903,271 dated Oct. 20, 2009; 20 pages.
USPTO Non-Final Rejection for U.S. Appl. No. 11/903,271 dated Apr. 7, 2009; 17 pages.
USPTO Notice of Allowance for U.S. Appl. No. 11/904,758 dated Oct. 13, 2010; 4 pages.
USPTO Final Rejection for U.S. Appl. No. 11/240,908 dated Nov. 14, 2007; 10 pages.
USPTO Final Rejection for U.S. Appl. No. 11/240,908 dated Nov. 14, 2008; 11 pages.
USPTO Final Rejection for U.S. Appl. No. 11/904,758 dated Oct. 29, 2009; 8 pages.
USPTO Final Rejection for U.S. Appl. No. 11/906,033 dated Dec. 22, 2010; 7 pages.
USPTO Miscellaneous Action for U.S. Appl. No. 09/990,739 dated Jun. 7, 2005; 4 pages.
USPTO Miscellaneous Action with SSP for U.S. Appl. No. 11/240,908 dated Aug. 24, 2006; 1 page.
USPTO Non-Final Rejection for U.S. Appl. No. 08/886,923 dated Feb. 16, 1999; 8 pages.
USPTO Non-Final Rejection for U.S. Appl. No. 09/176,047 dated Feb. 28, 2001; 7 pages.
USPTO Non-Final Rejection for U.S. Appl. No. 09/205,558 dated Oct. 18, 2000; 6 pages.
USPTO Non-Final Rejection for U.S. Appl. No. 09/232,578 dated Mar. 13, 2001; 7 pages.
USPTO Non-Final Rejection for U.S. Appl. No. 09/476,923 dated Aug. 29, 2000; 11 pages.
USPTO Non-Final Rejection for U.S. Appl. No. 09/812,475 dated Oct. 10, 2001; 4 pages.
USPTO Non-Final Rejection for U.S. Appl. No. 09/821,006 dated Mar. 10, 2004; 11 pages.
USPTO Non-Final Rejection for U.S. Appl. No. 09/878,488 dated Feb. 8, 2002; 7 pages.
USPTO Non-Final Rejection for U.S. Appl. No. 09/990,739 dated Apr. 7, 2004; 9 pages.
USPTO Non-Final Rejection for U.S. Appl. No. 09/990,739 dated Jul. 24, 2006; 17 pages.
USPTO Non-Final Rejection for U.S. Appl. No. 10/160,442 dated Jul. 22, 2005; 7 pages.
USPTO Non-Final Rejection for U.S. Appl. No. 10/160,442 dated Aug. 25, 2004; 7 pages.
USPTO Non-Final Rejection for U.S. Appl. No. 10/160,442 dated Oct. 17, 2005; 8 pages.
USPTO Non-Final Rejection for U.S. Appl. No. 11/240,908 dated Mar. 28, 2007; 6 pages.
USPTO Non-Final Rejection for U.S. Appl. No. 11/240,908 dated Apr. 8, 2008; 11 pages.
USPTO Non-Final Rejection for U.S. Appl. No. 11/904,758 dated Mar. 17, 2010; 9 pages.
USPTO Non-Final Rejection for U.S. Appl. No. 11/904,758 dated Apr. 1, 2009; 6 pages.
USPTO Notice of Allowance for U.S. Appl. No. 12/228,787 dated May 26, 2011; 8 pages.
USPTO Notice of Allowance for U.S. Appl. No. 12/228,787 dated Feb. 18, 2011; 5 pages.
USPTO Non-Final Rejection for U.S. Appl. No. 12/228,787 dated Jul. 23, 2010; 31 pages.
USPTO Notice of Allowance for U.S. Appl. No. 08/886,923 dated Aug. 30, 1999; 9 pages.
USPTO Notice of Allowance for U.S. Appl. No. 09/176,047 dated Jun. 26, 2001; 4 pages.
USPTO Notice of Allowance for U.S. Appl. No. 09/205,558 dated Mar. 23, 2001; 3 pages.
USPTO Notice of Allowance for U.S. Appl. No. 09/232,578 dated Aug. 24, 2001; 3 pages.
USPTO Notice of Allowance for U.S. Appl. No. 09/273,310 dated Dec. 18, 2000; 3 pages.
USPTO Notice of Allowance for U.S. Appl. No. 09/476,923 dated Feb. 5, 2001; 3 pages.
USPTO Notice of Allowance for U.S. Appl. No. 09/671,554 dated Apr. 16, 2003; 7 pages.
USPTO Notice of Allowance for U.S. Appl. No. 09/812,475 dated Aug. 13, 2002; 7 pages.
USPTO Notice of Allowance for U.S. Appl. No. 09/821,006 dated Aug. 9, 2004; 8 pages.
USPTO Notice of Allowance for U.S. Appl. No. 09/878,488 dated Jul. 26, 2002; 4 pages.
USPTO Notice of Allowance for U.S. Appl. No. 09/990,739 dated Feb. 7, 2007; 4 pages.
USPTO Notice of Allowance for U.S. Appl. No. 09/990,739 dated Mar. 26, 2007; 2 pages.
USPTO Notice of Allowance for U.S. Appl. No. 10/160,442 dated Mar. 2, 2006; 7 pages.
USPTO Notice of Allowance for U.S. Appl. No. 10/796,872 dated Sep. 6, 2006; 6 pages.
USPTO Notice of Allowance for U.S. Appl. No. 11/240,908 dated Jun. 11, 2009; 4 pages.
USPTO Notice of Allowance for U.S. Appl. No. 11/240,908 dated Sep. 14, 2009; 4 pages.
USPTO Notice of Allowance for U.S. Appl. No. 11/904,758 dated Sep. 8, 2010; 4 pages.
Written Opinion of the International Searching Authority for International Application No. PCT/US06133412 mailed Sep. 14, 2007; 4 pages.
"CY4611-FX2 USB to ATA/CF Reference Design Notes," Cypress Semiconductor Corporation, Nov. 2000-Jul. 2002, pp. 1-7; 7 pages.
"Designing a Robust USB Serial Interface Engine (SIE)," <http://www.usb.org/developers/whitepapers/siewp.pdf>, [Oct. 2003, Retrieved from the Internet on Mar. 25, 2010], pp. 1-9; 9 pages.

"EZ-USB FX2 Technical Reference Manual Version 2.1," Cypress Semiconductor Corporation, Copyright 2000 and 2001, pp. 1-130; 130 pages.

"EZ-USB FX2 USB Microcontroller High-Speed Usb Peripheral Controller," CY7C68013, Cypress Semiconductor Corporation, Jun. 21, 2002, pp. 1-50; 50 pages.

"Lucent Technology Delivers Instant USB for Peripherals," Press Release, Jan. 1997; 3 pages.

"Universal Serial Bus Mass Storage Class Bulk-Only Transport Revision 1.0," USB Implementers Forum, Sep. 31, 1999, pp. 1-22; 22 pages.

"Universal Serial Bus Mass Storage Class Control/Bulk/Interrupt Revision 1.0," USB Implementers Forum, Dec. 14, 1998, pp. 1-26; 26 pages.

"Universal Serial Bus Mass Storage Class Specification Overview Revision 1.2," USB Implementers Forum, Jun. 23, 2003, pp. 1-7; 7 pages.

"USB 2.0 Mux Interfaces USB, Non-USB Devices," EE Times Asia, May 15, 2007, http://www.eetasia.com/ART_8800464295_ 590626_NP_870689ba.HTM? 1000013030&8800464295 &click_from=1000013030,8619953561,May 15, 2007,EEOL,EENEWS.

Advanced Technology Attachment ATA-2 From: PC Guide.com Jan. 2003, pp. 1-14; 14 pages.

U.S. Appl. No. 12/228,787: "Bridge Device with Page-Access Based Processor Interface," Maheshwari et al., filed on Aug. 14, 2008; 54 pages.

U.S. Appl. No. 60/925,179 "Device, Method and Protocol for Data Transfer Between Host Device and Device Having Storage Medium" Jagadeesan Rajamanickam et al., filed Apr. 18, 2007; 17 pages.

Craig Peacock, "USB in a Nutshell," <http://www.beyondlogic.org/ usbnutshell/usb-in-a-nutshell.pdf>, Third Release, Nov. 2002, pp. 1-30; 30 pages.

CY4611-FX2 USB to ATA/CF Reference design Notes Cypress Semiconductor Corporation dated Nov. 2010; 7 pages.

Cypress Semiconductor Corporation, West Bridge Astoria Data Sheet CYWB0224ABS/CYWB0224ABM (Advanced Information), Revision A, Dec. 7, 2007, pp. 1-6; 6 pages.

Fairchild Semiconductor Corporation, Fairchild P/N "74AC00-Quad 2-Input NAND Gate," Nov. 1999, pp. 1-2; 2 pages.

Fairchild Semiconductor Corporation, Fairchild P/N "74AC04-Hex Inverter," Nov. 1999, pp. 1-2; 2 pages.

Inoue et al., "NAND Flash Applications Design Guide," Revision 1.0, Toshiba America Electronic Components Inc., Apr. 2003, pp. 1-29; 15 pages.

Intel USB Mobile System Design Guidelines, Revision 1.0, Nov. 6, 1996; 22 pages.

Intel USB Voltage Drop and Droop Measurement, Nov. 18, 1996; 19 pages.

International Search Report for International Application No. PCT/ US06/33412 mailed Sep. 14, 2007; 1 page.

International Search Report of International Searching Authority, dated Nov. 19, 2008 for International Application No. PCT/US08/ 09798; 4 pages.

International Written Opinion of International Searching Authority, dated Nov. 19, 2008 for International Application No. PCT/US08/ 09798; 5 pages.

ISL54200 Data Sheet FN6408.0, Intersil Americas Inc., Jan. 24, 2007.

ISR/WO for Application No. PCT/US08/09798 dated Nov. 19, 2008; 3 pages.

Jan Axelson, "USB Complete: Everything You Need to Develop USB Peripherals," 3rd Edition, Copyright 1999-2005, ISBN 978-1- 931448-03-1, pp. 51-59, 85-91, 225; 20 pages.

Kosar A. Jaff, "Universal Serial Bus and the Multimedia PC," 1996, Intel Corporation, pp. 1-9; 9 pages.

Lucent Technologies, "USS-720 Instant USB USB-to_IEEE 1284 Bridge," Advanced Data Sheet, Rev. 5, Nov. 1997, pp. 1-27; 28 pages.

Micron Technology Inc., NAND Flash Memory Data Sheet MT29F4G08AAA, MT29F8G08BAA, MT29F8GO8DAA, MT29F16G08FAA, 2006, pp. 3-81; 40 pages.

MoBL-USBTM FX2LP18 USB Microcontroller, Cypress Semiconductor Corporation, 2007.

NEC, "NEC USB2.0-ATA/ATAPI Bridge," NEC Press Release, Oct. 5, 2000, Retrieved from <http://www.nec.co.jp/press/en/0010/0501. html> on Mar. 25, 2010; 2 pages.

Philips Semiconductors, "PDIUSBBD11 USB Device with Serial Interface," Philips Semiconductors, Jul. 22, 1999.

Tom Pratt, "Serial ATA Interface on Client Systems," Dell Computer Corporation, Jun. 2003, pp. 1-4; 4 pages.

Universal Serial Bus Mass Storage Class Specification Overview Revision 1.1, Jun. 28, 2000; pp. 1-7; 7 pages.

Universal Serial Bus Specification Revision 2.0 USB Implementers Forum Apr. 27, 2000 pp. Title pp. ii, 1-83 and 195-296.

Universal Serial Bus Specification, Revision 1.0, Jan. 15, 1996, pp. 1-268; 268 pages.

Universal Serial Bus Specification, Revision 1.1 dated Oct. 23, 1998; 327 pages.

USPTO Advisory Action for U.S. Appl. No. 09/990,739 dated Feb. 2, 2005; 3 pages.

USPTO Advisory Action for U.S. Appl. No. 10/160,442 dated Apr. 22, 2005; 3 pages.

USPTO Advisory Action for U.S. Appl. No. 11/904,758 dated Jan. 7, 2010; 3 pages.

USPTO Final Rejection for U.S. Appl. No. 09/812,475 dated May 8, 2002; 7 pages.

USPTO Final Rejection for U.S. Appl. No. 09/990,739 dated Oct. 28, 2004; 9 pages.

USPTO Final Rejection for U.S. Appl. No. 09/990,739 dated Dec. 6, 2006; 12 pages.

USPTO Final Rejection for U.S. Appl. No. 10/160,442 dated Feb. 9, 2005; 8 pages.

USPTO Final Rejection for U.S. Appl. No. 10/160,442 dated Dec. 23, 2005; 10 pages.

West Bridge Antioch USB/Mass Storage Peripheral Controller Cypress Semiconductor Corporation Revised Mar. 14, 2007 Document # 001-07978 Rev *C; 20 pages.

* cited by examiner (Receive OUT Packet)

(Send Data OUT to S-Port)

(Receive RESP Packet from Proc)

(Response as IN Packet to Host)

(Send Control OUT to P-port)

(Data IN Packet to Host)

(Copy Ctrl OUT Packet from OUT Buff to IN Buff)

(Ctrl OUT Packet to Proc)

```
1   Configure EP2 into OUT Direction
2   Enable EP2 Buffer
3   Configure EP4 into IN Direction
4   Enable EP4 Buffer 5   If Request = SendFileData
6       Receive OUT Packet from Host Port
7       EP2 Buff Generates Interrupt
8       If Packet_EP = EP2
9           Read Section of Packet to Determine Destination Port
10              If Port = P
11                  Call Subroutine SUB1
12              If Port = S
13                  Processor Port sends file attributes to Controller
14                  Processor Port indicates when data will xferred from Host Port
15                  Configure EP2 Buffer for automatic output
16                  Configure Storage I/F for automatic write
17                  Call Subroutine SUB2
18              Else Error Indication
19          Else process according to EP or Error Indication 20  If Request = GetFileID
21      Receive OUT Packet from Host Port
22      Generate Interrupt
23      If Packet_EP = EP2
24          Read Section of Packet to Determine Destination Port
25              If Port = P
26                  Call Subroutine SUB1
27              If Port = S
28                  Processor Port sends file attributes to Controller
29                  Processor Port indicates when data will xferred from Storage
30                  Configure EP2 Buffer for automatic input
31                  Configure Storage I/F for automatic read
32                  Call Subroutine SUB2
33              Else Error Indication
34          Else process according to EP or Error Indication
```

FIG. 5A

```
    Subroutine SUB1
1       Controller configures Host Port to block acknowledgments to Host
2       Controller stores transaction status for EP2 (Toggle)
3       Controller determines available bytes in EP2 buffer
4       Controller sets EP2 Buffer pointer to packet start
5       Controller configures EP2 to IN direction without indicating so to Host
6       Controller configures MUX to Processor Direction
7       Controller notifies Processor Port data is ready
8       Processor Port readies data transfer registers
9       If Processor asserts data transfer signal
10          Processor Port reads data from EP2 Buffer
11          Processor Port notifies Controller of transfer completion
12          Controller Configures EP2 to OUT direction
13          Controller restores transaction status for EP2 (Toggle)
14          Controller restores Host Port to provide acknowledgments to Host
15          Controller configures MUX to Host Direction
16          Return to 2) in Main Routine
17      Else Controller notify Processor Port until timeout/error
```

FIG. 5B

```
Subroutine SUB2
1    Controller configures Host Port to block acknowledgments to Host
2    Controller configures MUX to Processor Direction
3    Controller stores transaction status for EP4 (Toggle)
4    Controller configures EP4 to OUT direction without indicating so to Host
5    Controller informs Processor Port to send Response Packet
6    Processor Port sends Response Packet to EP4 Buffer
7    EP4 Buffer Generates Interrupt for Controller when Response Packet finished
8    Controller Configures EP4 to IN direction
9    Controller sets EP4 pointer to packet start
10   Controller restores transaction status for EP4 (Toggle)
11   Controller restores Host Port to provide acknowledgments to Host
12   Controller configures MUX to Host Direction
```

FIG. 5C

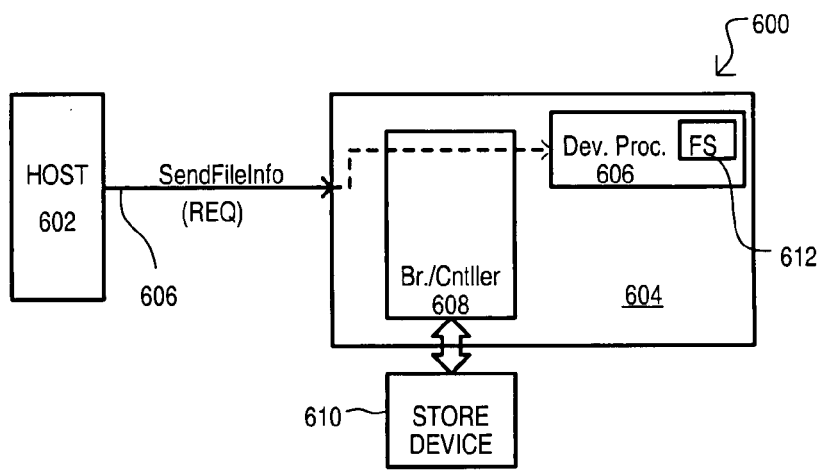

FIG. 6A

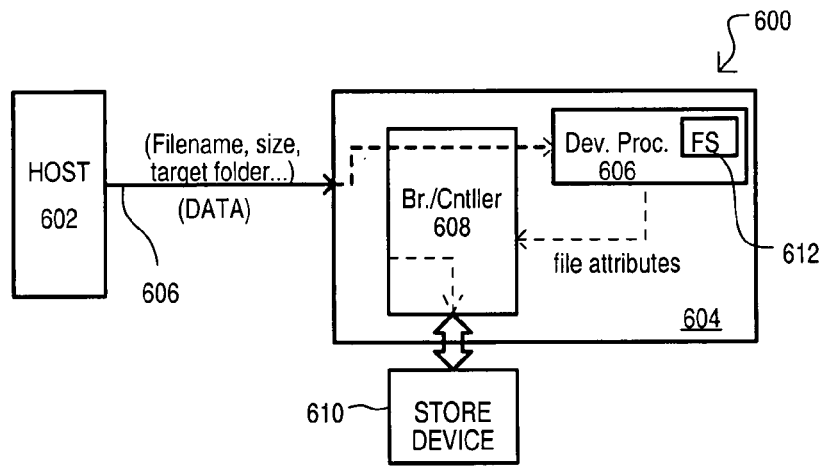

FIG. 6B

DEVICE, METHOD, AND PROTOCOL FOR DATA TRANSFER BETWEEN HOST DEVICE AND DEVICE HAVING STORAGE INTERFACE

This application claims the benefit of U.S. provisional patent application Ser. No. 60/925,179 filed on Apr. 18, 2007, the contents of which are incorporated by reference herein.

TECHNICAL FIELD

The present invention relates generally to systems having a host device and one or more secondary devices that include a storage media, and more particularly to systems and system components for transferring data between a host device and a secondary device.

BACKGROUND OF THE INVENTION

The decreasing cost and increased capacity of portable mass storage media has resulted in numerous secondary devices with an increased ability to store relatively large sized media files, such as picture files, music files, and/or video files, as but a few examples. Secondary devices can take numerous forms, such as audio or video players (e.g., MP3 type players), cell phones incorporating audio/video players, portable gaming devices, personal digital assistants (PDAs), digital still and/or video cameras, and other devices integrating such functions, to name but few.

Typically, a secondary device can include an interface by which data can be transferred out of a host device into the secondary device and/or from the secondary device into the host device. A host device can be a device that can control such data transfers, and can also take various forms. For example, a host device can be larger device, such as a personal computer (PC). However, a host device can be a smaller device, such as another secondary device designated as a host, or some other device type such as a home entertainment system, gaming console, printer, automobile entertainment system, to name but a few of the many possible examples.

Data transfers between a host and secondary device are usually executed according to a predetermined protocol and interface. As but one very particular example, the Media Transfer Protocol (MTP), promulgated by Microsoft Corporation can be used for content exchange between a desktop host system and a secondary device, such as mobile handsets. MTP can operate in conjunction with a universal serial bus (USB) type interface.

In certain secondary device designs, a USB interface and storage functions can be placed in a device such as a bridge/controller.

To better understand various features of the disclosed embodiments, two examples of conventional approaches to implementing MTP type transfers will now be described.

Referring now to FIG. 10, a conventional system is shown in a block diagram and designated by the reference character 1000. Conventional system 1000 can include a host device 1002 and a secondary device 1004. A secondary device 1004 can include a processor 1006, a bridge/controller 1008, and one or more storage sections 1010 (different storage sections shown as 1010-0 and 1010-1). A processor 1006 can include a file system 1011 that can organize data files stored within storage sections 1010. Thus, processor 1006 has direct access to file system 1011.

A bridge/controller 1008 can have a USB interface (I/F) 1012, a processor I/F 1014, and a store I/F 1016. A USB I/F 1012 can provide a communication path between secondary device 1004 and host device 1002. Similarly, a processor I/F 1014 and store I/F 1016 can provide communication paths between bridge/controller 1008 and processor 1006 and storage sections 1010, respectively. Bridge/controller 1008 can provide communication paths between I/Fs 1012, 1014 and 1016.

FIG. 10 also shows two communication processing paths, a data path 1018 and a control path 1020.

In the conventional approach shown in FIG. 10, an MTP type transfer can be implemented "inside" processor 1006. That is, all communication traffic (both control and data) can go through processor 1006. In such an arrangement, a processor 1006 can maintain a file system that includes information on data files contained within store section 1010 and can directly control traffic during accesses to storage section 1010. For example, during a file download operation, data packets can travel from host device 1002 through host I/F 1012 through bridge/controller 1008 and to processor 1006, via processor I/F 1014. Such packets can then travel from processor 1006 to storage section 1010 via store I/F 1016. This manner of operation is conceptualized in FIG. 10 by data path 1018 and control path 1020 both passing from host device 1002 through processor 1006 to storage section 1010.

A conventional arrangement like that of FIG. 10 can have limited throughput as data travels from a host device 1002 to a processor 1004 and then from processor 1004 to storage section 1010. In addition, such a conventional arrangement can require relatively large overhead (e.g., processing power, instruction set size and/or memory capacity) to control such operations. In particular, such operations can consume an undesirably large amount of processor resources (memory, processor cycles) that might otherwise be used for executing other tasks associated with the secondary device 1004.

Referring now to FIG. 11, a second conventional system is shown in a block diagram and designated by the general reference character 1100. A system 1100 can include some of the same general components as that of FIG. 10, thus like components are referred to by the same reference character but with the first two digits being "11" instead of "10".

System 1100 of FIG. 11 can differ from that of FIG. 10 in that a bridge/controller 1108' can include greater hardware resources than that shown as 1008 in FIG. 10. In particular, a bridge controller 1108' can have direct access to a file system 1111', and can include additional computing power to enable packet processing. Such additional resources can enable MTP type transfers to be implemented within bridge/controller 1108'. For example, during a file download operation, data packets can travel from host device 1102 to bridge/controller 1108'. Bridge/controller 1108' can then determine and track where such files are be stored, and output such files to storage section 1110. This manner of operation is conceptualized in FIG. 11 by data path 1118-H and control path 1120-H both passing from host device 1102 through bridge controller 1108' to storage section 1110. At the same time, another data path 1118-P and control path 1120-P are shown passing from processor 1106' through bridge controller 1108' to storage section 1110.

A conventional system 1100 shown in FIG. 11 can require a higher performance computing circuit within bridge controller 1108' than the other conventional example of FIG. 10. In addition, a bridge/controller 1108' can require a larger memory size, as a file system 1111' is maintained within the bridge/controller. This can result in greater cost and/or size for a secondary device 1104.

BRIEF DESCRIPTION OF THE DRAWINGS

FIGS. 5A to 5C show instructions executable by a controller circuit of a bridge/controller device according to another embodiment.

FIGS. 6A to 6I are block diagrams showing a method of transferring files according to a protocol of one embodiment of the invention.

DETAILED DESCRIPTION

Figure 10:
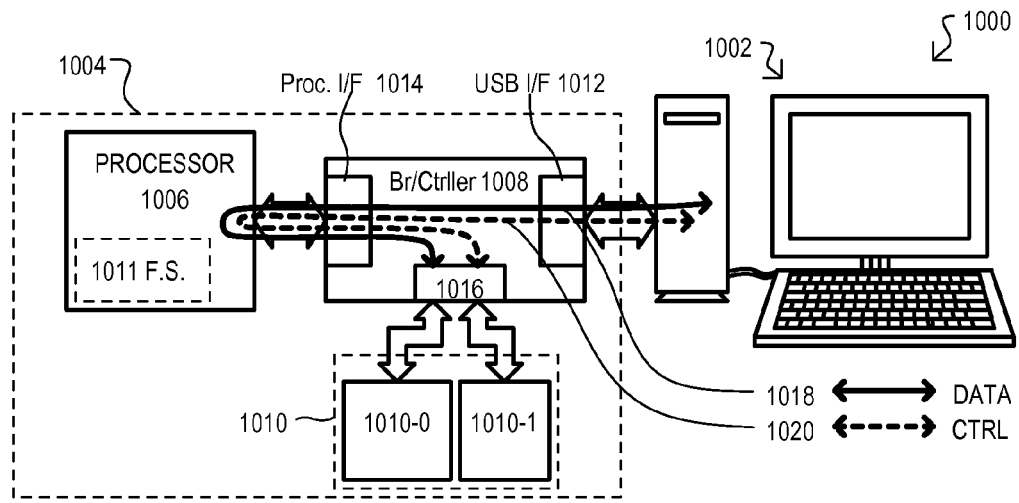
FIG. 10 is a block diagram of a first conventional file transfer system.

Various embodiments will now be described in detail that show methods, systems, selected system components, and protocols for transferring data between a host device and a device having a storage medium. Embodiments can include a "split" transfer method that can provide a data transfer path between a host device and storage interface in a secondary device that can bypass a secondary device processor. Such an arrangement can provide significant throughput advantages over conventional arrangements like that shown in FIG. 10.

Figure 1:
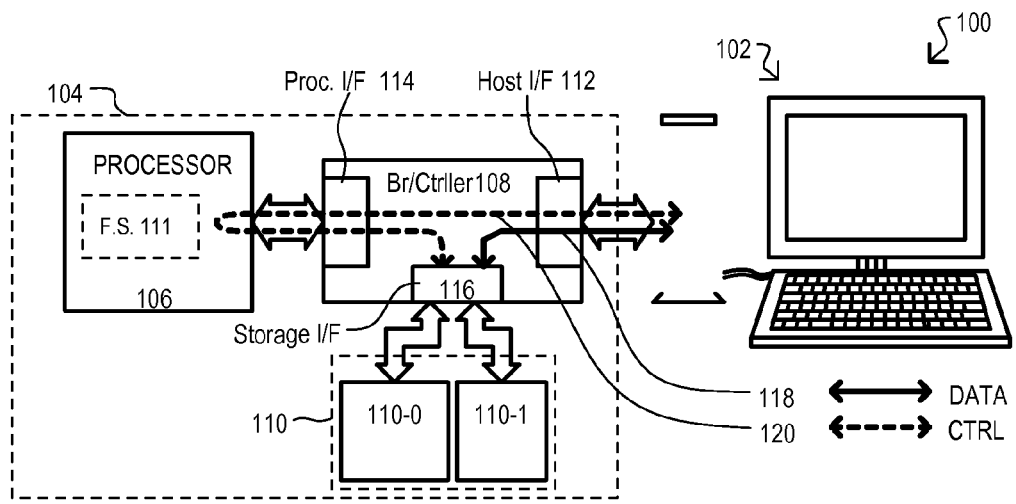
FIG. 1 shows a block diagram of a system according to one embodiment of the invention.

Referring now to FIG. 1, a system according to a first embodiment is shown in a block diagram and designated by the reference character 100. System 100 can include a host device 102 and a secondary device 104. A secondary device 104 can include a processor 106, a bridge/controller 108, and one or more storage sections 110 (different storage sections shown as 110-0 and 110-1).

A processor 106 can include a file system 111 that can organize data files stored within storage section 110. As but one example, a file system 111 can be stored in a memory (e.g., random access memory) accessible by a processing unit of processor 106. A file system can provide information on files, such as a file identifier (e.g., a file handle), file size (e.g., number of bytes), file location (e.g., file relation to higher level structures, such as folders, as well as physical address(es) for data of the file), to name but a few examples. Thus, file system storage and maintenance can be undertaken by a processor 106 and not a bridge/controller 108.

A bridge/controller 108 can have a host interface (I/F) 112, a processor I/F 114, and a storage I/F 116. In the embodiment of FIG. 1, a host I/F 112 can provide a communication path between a host device 102 and bridge/controller 108, a store I/F 116 can provide a communication path between bridge/controller 108 and storage section 110, and a processor I/F 114 can provide a communication path between bridge/controller 108 and processor 106.

Figure 11:
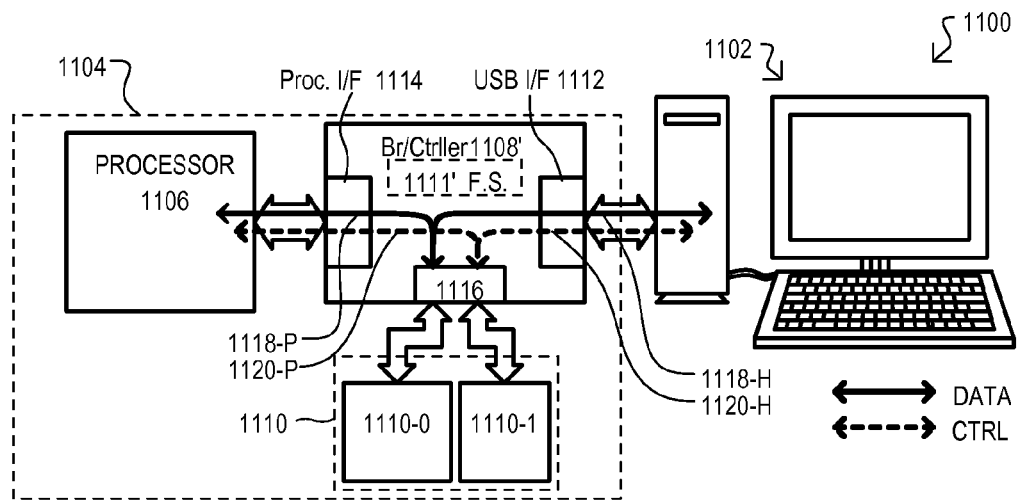
FIG. 11 is a block diagram of a second conventional file transfer system.

However, unlike the conventional approaches described above, a bridge/controller 108 can provide configurable data paths between I/Fs (112, 114 and 116) that can be switched according to operation and/or data type (e.g., control or data). More particularly, a bridge/controller 108 can transfer control data from a host I/F 112 to a processor I/F 114 by a path that bypasses a storage I/F 116. In addition, bridge/controller 108 can transfer data from a host I/F 112 to a storage section 110 by a path that can bypass a processor I/F 114. Such an arrangement can allow for fast data transfers to storage section 110, as such transfers do not pass through to a processor 106, as in the case of FIG. 10. At the same time, file system information can be maintained by a processor 106 rather than a bridge/controller 108, allowing bridge/controller 108 to be smaller, less expensive, or have additional resources that would otherwise be dedicated to a file system, as in the case in FIG. 11.

Such advantageous processing paths are shown in FIG. 1. FIG. 1 shows two communication paths, a data path 118 and a control path 120. Unlike the conventional approach shown in FIG. 10, a data path 118 can pass from a host I/F 112 to a storage I/F 118, and not pass through processor I/F 114. At the same time, a control path 120 can pass from host I/F 112 to processor I/F 118.

In this way, a system can provide separate communication paths through a bridge/controller depending upon whether data or control information is been received or sent.

Having described one example of system that can include a secondary device with a bridge/controller, a particular example of a bridge/controller will now be described.

Figure 2A:
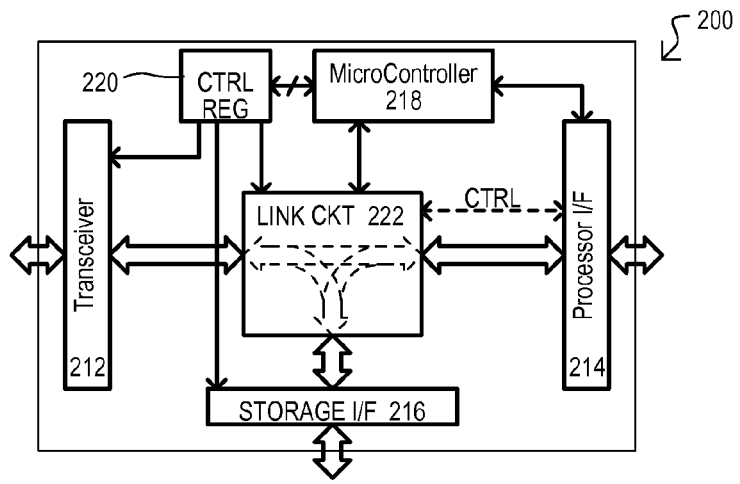
FIGS. 2A to 2C show a bridge/controller device and associated configurations according to embodiments of the invention.

Referring to FIG. 2A, a bridge/controller according to one embodiment is shown in a block schematic diagram and designated by the general reference character 200. In one very particular arrangement, a bridge/controller 200 can be considered related to the embodiment of FIG. 1 in that it can represent one example of bridge/controller shown as 108. A bridge/controller 200 can include some of the same general sections as that shown In FIG. 1, thus like sections are referred to by the same reference character but with the first digit being a "2" instead of a "1".

As shown in FIG. 2A, in addition to I/Fs 212, 214, and 216, bridge/controller 200 can include a controller circuit 218, control registers 220, and a link circuit 222. In the particular example of FIG. 2A, a host I/F 212 can be serial I/F receiving data in serial format and providing such data in parallel form to a link circuit 222. In one very particular arrangement, a host I/F 212 can be a universal serial bus (USB) transceiver.

A controller circuit 218 can execute predetermined operations in response to selected inputs. As but one example, a controller circuit 218 can be a microcontroller having an instruction store (e.g., firmware) and operational memory (e.g., random access memory). Such a microcontroller can execute predetermined instructions in response to commands received via a processor I/F 214.

Control registers 220 can be addressable storage locations that can output values for controlling the configuration of link circuit 222, and optionally, any of I/Fs 212, 214 and/or 216. In this way, a controller circuit 218 can configure bridge/controller 200 by writing values to registers. In alternate embodiments, a controller 220 could directly output control signals to such other sections.

A link circuit 222 can be connected between I/Fs 212, 214 and 216, and can provide configurable paths between such I/Fs based on configuration data contained within control registers 220 or control values provided from I/F 214.

Having described the general construction of the bridge/controller 200, examples of bridge/controller 200 operations will now be described with reference to FIGS. 2B and 2C.

Figure 2B:
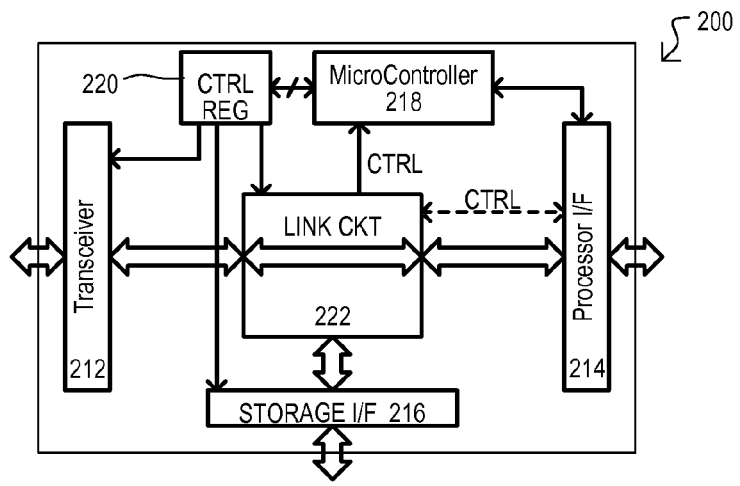

FIG. 2B shows the bridge/controller 200 of FIG. 2A configured to create a control data path. In the example shown, in response to received control data, a processor connected to processor I/F 214, or alternatively controller circuit 218, can write values to control registers 220 that configure link circuit 222 to provide a communication path between host I/F 212 and processor I/F 214. For example, a link circuit 222 can receive a packet. A controller circuit 218 can examine the packet and determines that it contains control information. In response to such a determination, controller circuit 218 can transfer the data packet via a data path between host I/F 212 and processor I/F 214. It is understood that "control data" can be data utilized by a secondary device 200 to configure or alter the operation of the device, or other devices attached to the secondary device 200 (e.g., a command). This is in contrast to "data for storage" which is a data intended for storage within a secondary device (e.g., a media file).

Figure 2C:
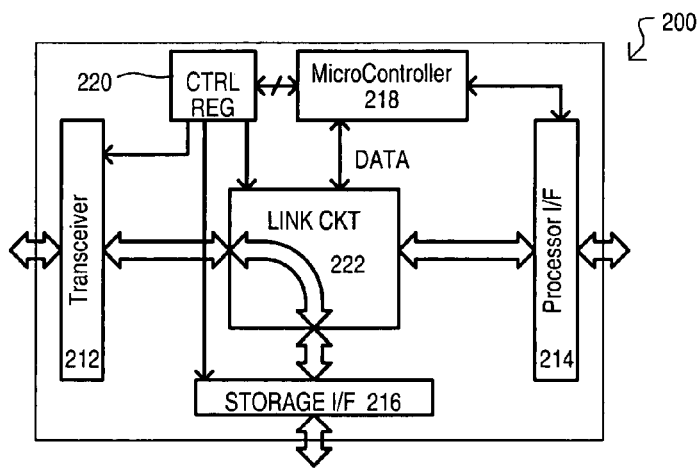

FIG. 2C shows the bridge/controller 200 of FIG. 2A configured to create a data path. Such a configuration can be established by a processor connected to processor I/F 214 (not shown). Like FIG. 2B, in response to received data intended for storage, link circuit 222 can provide a path between host I/F 212 and storage I/F 216. Such a path can bypass a processor I/F 214. For example, a link circuit 222 can receive a packet. A controller circuit 218 can examine the packet and determines that it contains data for storage. In response to such a determination, controller circuit 218 configures a data path between host I/F 212 and storage I/F 216.

In this way, a link circuit can be configured to provide an essentially direct path for data depending upon the type of data being transferred.

Referring now to FIGS. 3A to 3D a bridge/controller according to another embodiment is shown in block schematic diagram, and designated by the general reference character 300. As in the case of FIG. 2A, in one very particular arrangement, the bridge/controller 300 can be considered related to the embodiment of FIG. 1 in that it can represent one example of bridge/controller shown as 108. A bridge/controller 300 can include some of the same general sections as that shown In FIG. 1, thus like sections are referred to by the same reference character but with the first digit being a "3" instead of a "1".

Figure 3A:
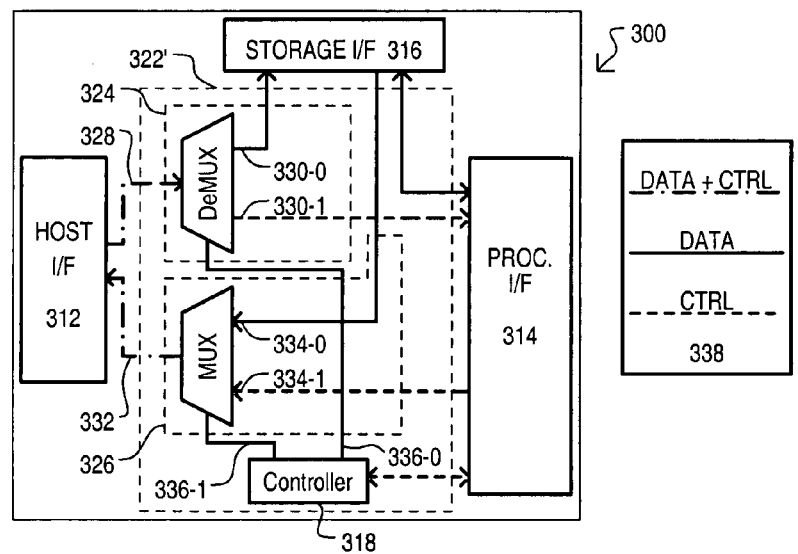
FIGS. 3A to 3D show another bridge/controller device and associated operations according to another embodiment of the invention.

In the arrangement of FIG. 3A, a bridge/controller 300 can include a link circuit 322' situated between I/Fs 312, 314 and 316. Link circuit 322' can include a de-multiplex (de-MUX) data path 324 and a multiplex (MUX) data path 326. A de-MUX data path 324 can include a de-MUX input 328 connected to an output of host I/F 316, a first output 330-0 connected to storage I/F 316, and a second output 330-1 connected to processor I/F 314. In response to data received on a first control signal path 336-0, de-MUX data path 324 can be configured to transfer data at de-MUX input 328 to either of first or second outputs (330-0 and 330-1).

In a similar fashion, a MUX data path 326 can include a MUX output 332 connected to an input of host I/F 316, a first input 334-0 connected to storage I/F 316, and a second input 334-1 connected to processor I/F 314. In response to data received on a second control signal path 336-1, MUX data path 326 can be configured to provide a data path from either of MUX inputs (334-0 and 334-1) to MUX output 332.

In the arrangement of FIG. 3A, a processor connected to I/F 214 or controller circuit 318 can place configuration information on first and second control signal paths (336-0 and 336-1). It is noted that while FIG. 3A shows separate control signal paths (336-0 and 336-1), alternate embodiments can include common control of both de-MUX data path 324 and MUX data paths 326. That is, de-MUX data path 324 and MUX data paths 326 can simultaneously switch in response to the same control signal(s). Further, control signals can be provided to link circuit 322' by way of registers, or the like, accessible by a processor via I/F 214, by controller circuit 318, or both.

FIGS. 3A to 3D also represent particular signal paths according to the type of information carried by such paths during file transfer operations. In particular, as shown by key 338, a host I/F 312 can provide both data (i.e., data intended for storage) and control values to de-MUX data path 324. In contrast, a first output 330-0 of de-MUX data path 324 can be utilized to transfer large data values and not control values. In contrast, a second output 330-1 of de-MUX data path 324 can be utilized to provide control values and not large data values. More particularly, in predetermined operations that involve the transfer of large amounts of data from host I/F 312 to storage I/F 316 first output 330-0 can provide an essentially direct path for file data values while second output 330-1 can provide a path for control values. In contrast, for relatively small data transfers or as dictated by a processor at I/F 214, both control values and data values can be transferred via second output 330-1.

MUX data path 326 can be conceptualized as operating in the reverse fashion. For example, a host I/F 312 can receive both data and control values from output 332 of MUX data path 326, while a first input 334-0 of MUX data path 326 can receive data values and not control values in certain large data transfers, and a second input 334-1 of MUX data path 326 can receive control values and not data values such large data transfers. For smaller data transfer operations or particular operations established by a processor at IF 214, second input 334-1 can carry both control and data values.

Having described the general construction of a bridge/controller 300 with reference to FIG. 3A, the operation of such a bridge/controller will now be described with reference to FIGS. 3B to 3D.

Figure 3B:
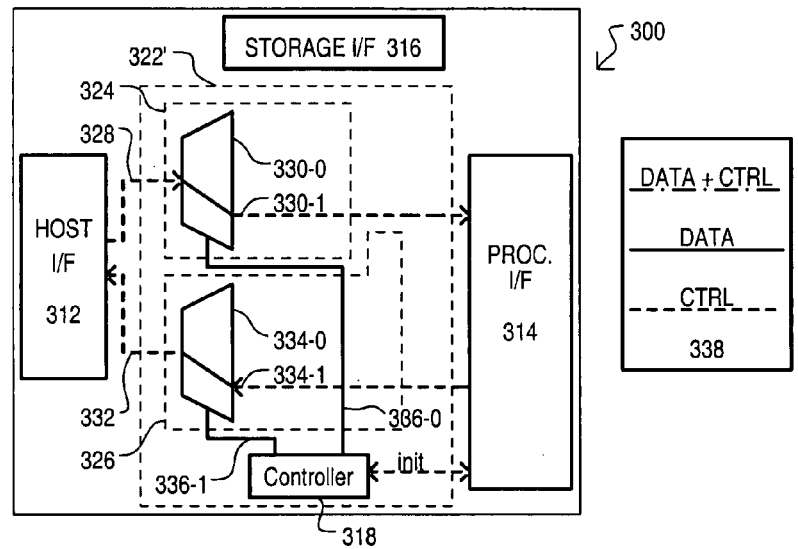

FIG. 3B shows a bridge/controller 300 in a control mode of operation. De-MUX data path 324 can be configured to forward values received at de-MUX input 328 to processor I/F 314. As but one example, a request packet that includes a particular operation request can be sent along such a data path for subsequent processing by a processor connected to processor I/F 314. FIG. 3B also shows MUX data path 326 configured to forward values received at second input 334-1 to MUX output 332. Again, as but one example, a response packet that includes a result of a particular requested operation can be sent along such a data path and received by a host device connected to host I/F 312.

In this way, a bridge/controller 300 can be configured to send and receive control values between a host device and a processor.

Figure 3C:
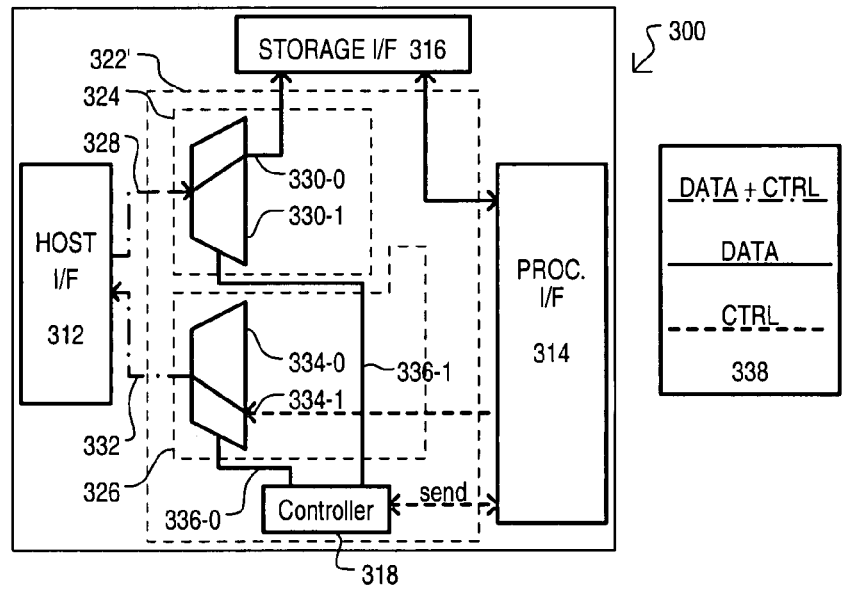

FIG. 3C shows a bridge/controller 300 in a data transfer OUT mode of operation. In this description, data transfer operation directions (i.e., IN or OUT) are referenced with respect to a host I/F 312. Thus, a data OUT operation illustrates data being transferred from a host I/F 312 to a storage I/F 316. In the configuration of FIG. 3C, de-MUX data path 324 can be configured to forward values received at de-MUX input 328 to storage I/F 316. Such a path does not include, and can completely bypasses processor I/F 316. In one particular application, a data packet, or sequence of data packets, can be sent along such a data path for subsequent storage within a storage device connected to storage I/F 316. FIG. 3C also shows the same essential MUX data path 326 as FIG. 3B. In one example, such a path can be utilized to send a response packet once a data transfer operation has been completed.

Figure 3D:
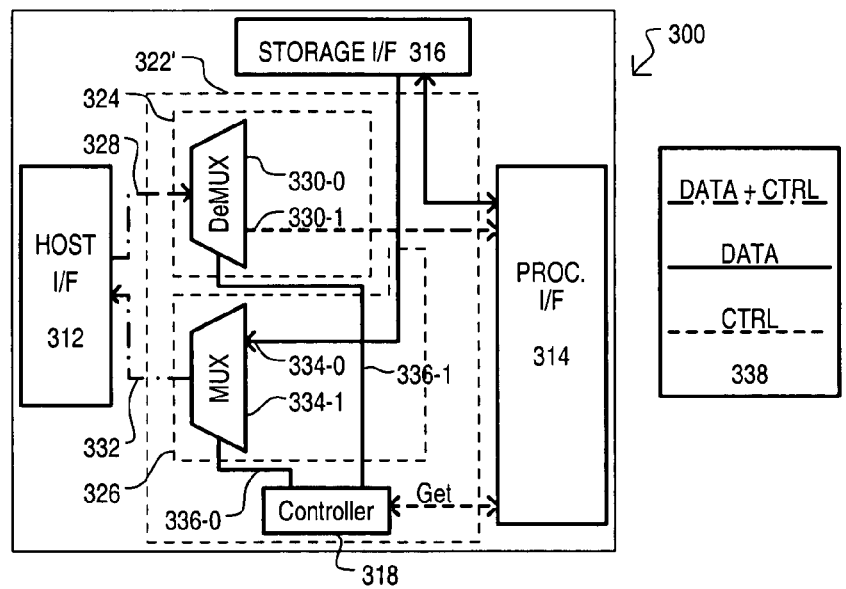

FIG. 3D shows a bridge/controller 300 in a data transfer IN mode of operation. In such an operation MUX data path 324 can be configured to forward data received at first MUX input 334-0 to MUX output 332. As in the data OUT mode of operation, such a path does not include, and completely bypasses processor I/F 316.

In this way, a bridge/controller 300 can be configured to transfer data values, more particularly large numbers of data values, between a storage device and host device along a path independent of a path utilized for control data.

Referring now to FIGS. 3E to 3I, a bridge/controller according to yet another embodiment is shown in block schematic diagram, and designated by the general reference character 350. As in the case of FIG. 3A, in one very particular arrangement, the bridge/controller 350 can be considered related to the embodiment of FIG. 1 in that it can represent one example of bridge/controller shown as 108. A bridge/controller 350 can include some of the same general sections as that shown In FIG. 3A, thus like sections are referred to by the same reference character.

The bridge/controller 350 can differ from that of FIGS. 3A to 3D in that it can include a first first-in-first-out (FIFO) memory 370 and a second FIFO memory 372. First FIFO memory 370 can be arranged between host I/F 312 and de-MUX input 328. Second FIFO memory 372 can be arranged between host I/F 312 and MUX output 332. Various operations for the embodiment shown in FIGS. 3E to 3I will now be described.

Figure 3E:
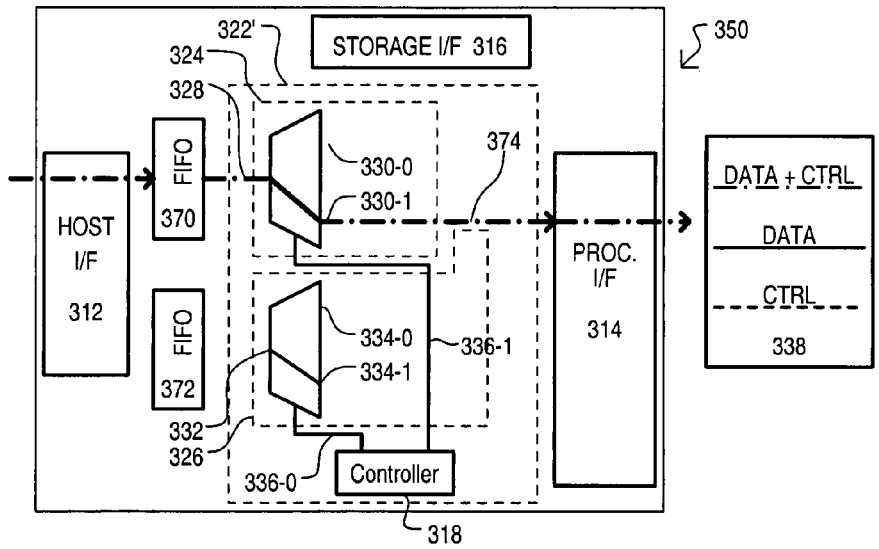
FIGS. 3E to 3I show a bridge/controller device and associated operations according to a further embodiment.

Referring to FIG. 3E, a bridge/controller 350 can have an initial or default state in which de-MUX data path 324 and MUX data path 332 are configured as shown. That is, de-MUX data path 324 provides a path from first FIFO memory 370 to processor I/F 314, and MUX data path 326 provides a path from processor I/F 314 and second FIFO memory 372. In such a state, a host device (not shown) can issue control and data information along path 374 as shown. Such information can be stored in first FIFO memory 370, and then forwarded through de-MUX data path 324 to a processor connected to processor I/F 314.

Figure 3F:
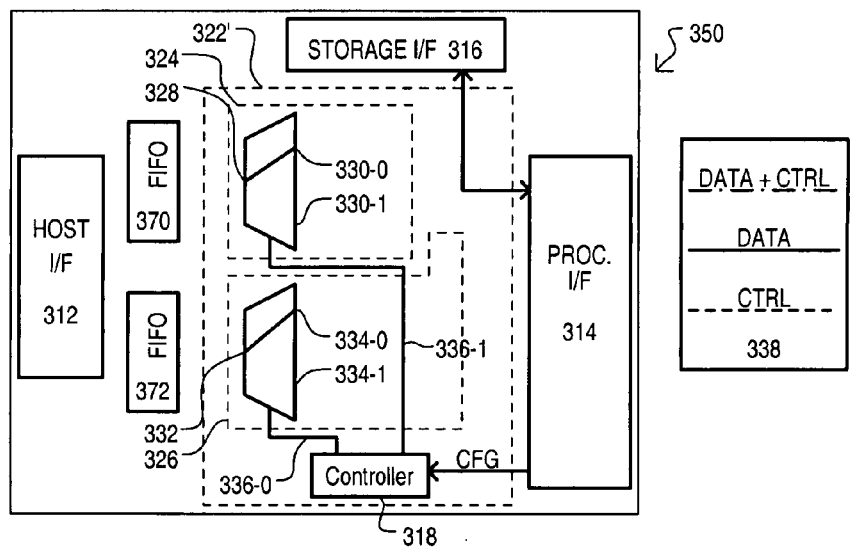

Referring to FIG. 3F, in response to information received from a host device, a processor can provide configuration information (CFG) that can directly, or indirectly via controller circuit 318, reconfigure de-MUX data path 324 and MUX data path 326. In particular, de-MUX data path 324 can be reconfigured to provide a path from first FIFO memory 370 to storage I/F 316, and MUX data path 326 can be reconfigured to provide a path from processor I/F 314 to second FIFO memory 372. Such a reconfiguration can take place prior to a large data transfer operation between host I/F 312 and storage I/F 316.

Figure 3G:
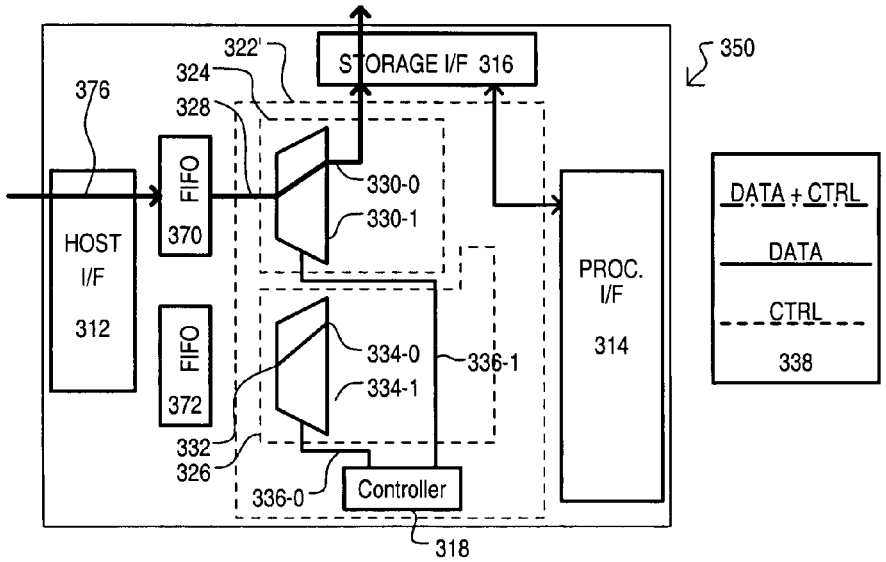

Referring to FIG. 3G, one example of a data transfer following the above reconfiguration operation is shown. A host device can output file data along path 376 as shown. In particular, file data originating from a host device can be received at host I/F 312 and stored in first FIFO memory 370. Once first FIFO memory 370 is filled, such data can be forwarded through de-MUX path 324 to storage I/F 316 for storage in a storage device.

Figure 3H:
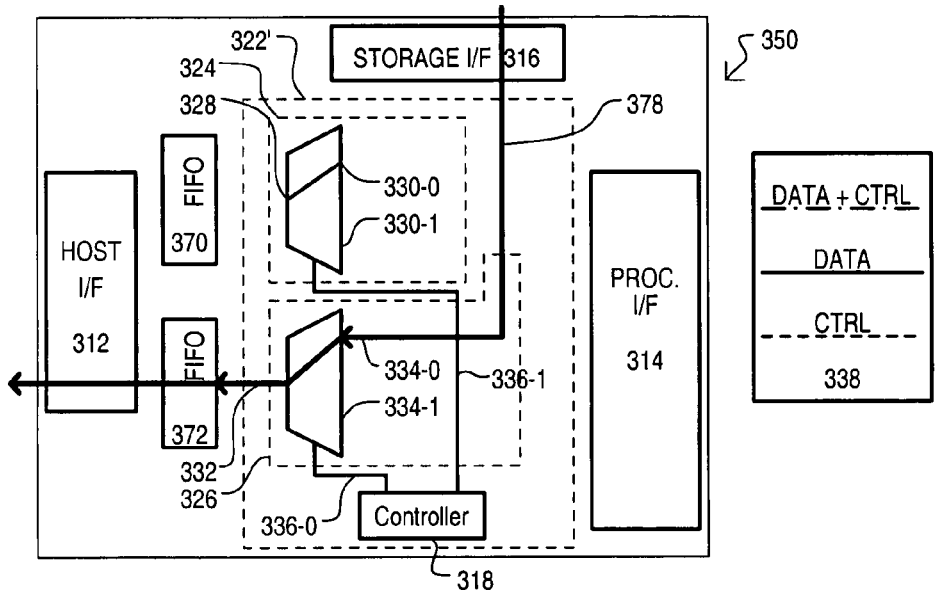

Referring to FIG. 3H, another example of a data transfer following the above reconfiguration operation is shown. A storage device (not shown) can output file data along path 378 as shown. In particular, file data originating from a storage device can be received at storage I/F 316 and forwarded through MUX path 326 and stored in second FIFO memory 372. Once second FIFO memory 372 is filled, such data can be output to a host device via host I/F 312.

Figure 3I:
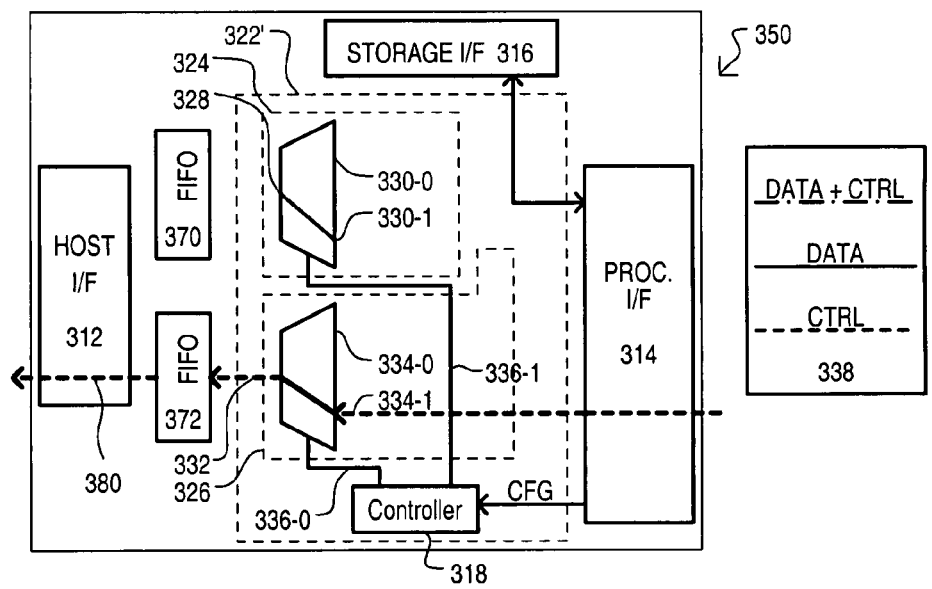

Referring to FIG. 3I, following the completion or termination of a data transfer operation, a processor can return a bridge/controller 350 to an original configuration. More particularly, a processor can provide configuration information (CFG) that can directly, or indirectly via controller circuit 318, reconfigure de-MUX data path 324 and MUX data path 326 to the same state as shown in FIG. 3E. In addition, a processor can provide control information confirming such an operation along control path 380 as shown.

In this way, for predetermined operations, such as the transfer of relatively large data files, a bridge/controller can be switched to provide an essentially direct data path between a host device and storage device.

Referring now to FIGS. 4A to 4I a bridge/controller according to yet another embodiment is shown in block schematic diagram, and designated by the general reference character 400. As in the case of FIG. 2A, in one very particular arrangement, the bridge/controller 300 can be considered related to the embodiment of FIG. 1 in that it can represent one example of bridge/controller shown as 108. A bridge/controller 400 can include some of the same general sections as that shown In FIG. 1, thus like sections are referred to by the same reference character but with the first digit being a "4" instead of a "1".

In the embodiment illustrated in FIGS. 4A to 4I, in addition to controller 418 and I/Fs 412, 414 and 416, a bridge/controller 400 can include a link circuit 423 and an endpoint indicator 440. Link circuit 423 can include a MUX section 442 and a buffer section 444. A MUX section 442 can include an input MUX 446 and an output de-MUX 448. An input MUX 446 can have one input connected to a host I/F 412, another input connected to a processor I/F 414, and an output connected to buffer section 444. An output de-MUX 448 can have one output connected to a host I/F 412, another output connected to a processor I/F 414, and an input connected to buffer section 444. A MUX section 442 can be configurable between a host direction (input MUX 446 inputs data from host I/F 412; output de-MUX 448 outputs data to host I/F 412) and a processor direction (input MUX 446 inputs data from processor I/F 414; output de-MUX 448 outputs data to processor I/F 414).

A buffer section 444 can include a number of buffers, each assigned to an "endpoint" within bridge/controller 400. In the very particular example shown, buffer section 444 can include a first endpoint buffer 450 and a second end point buffer 452. Each endpoint buffer (450 and 452) can be configurable to operate in an OUT direction (receive data from MUX section 442) or operate in an IN direction (output data to MUX section 442). In addition, a first endpoint buffer 450 can additionally output data to store I/F 416, while second endpoint buffer 452 can input data from store I/F 416.

In one very particular arrangement, first and second endpoint buffers (450 and 452) can be first-in-first-out (FIFO) memory circuits that can track how much storage is occupied by an incoming data packet, provide an interrupt when a data packet transfer is complete (data completely read from buffer, or completely written to buffer), and maintain a transaction status indicator (i.e., toggle value) to maintain synchronization with a host device during a data transfer operation.

An endpoint indicator 440 can receive an endpoint value from a host I/F 412 that indicates an intended endpoint for a received packet.

Controller circuit 418 can provide configuration values for interfaces 412, 414, and 416, and in addition can access endpoint indicator 440, first endpoint buffer 450, and second endpoint buffer 452. A controller circuit 418 can also include a direct communication path 454 to processor interface 414 that does not pass through MUX section 442. In the particular example illustrated, controller circuit 418 can also configure host I/F 412 into a "no acknowledgement" state, in which accesses to given endpoints will not be acknowledged by host I/F 412.

Figure 4A:
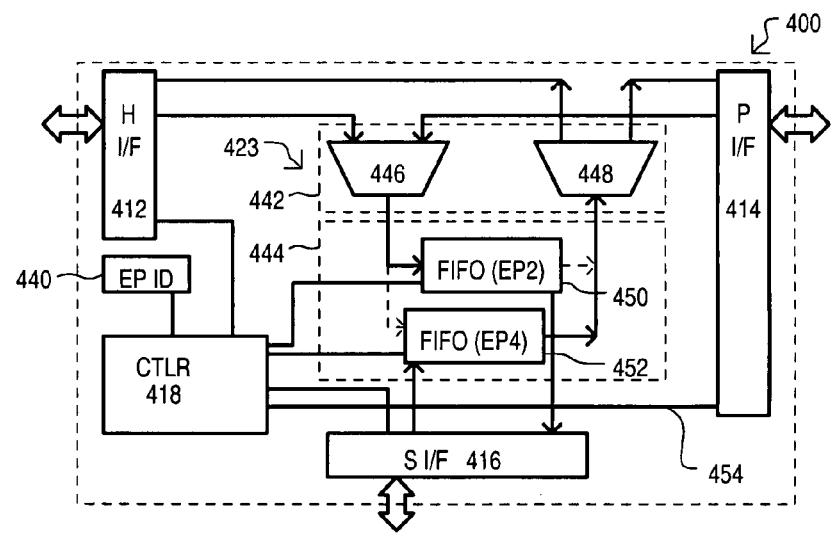
FIGS. 4A to 4I show yet another bridge/controller device and associated operations according to another embodiment of the invention.

It is noted that FIG. 4A shows one example of an initial configuration for a bridge/controller 418. In particular, first endpoint buffer 450 is configured in the OUT direction, and so can receive data values via input MUX 446, while second endpoint buffer 452 is configured in the IN direction, and so can output data values to output de-MUX 448. In addition, MUX section 442 is shown configured in the host direction.

Having described the general construction of a bridge/controller 400 with reference to FIG. 4A, various operation of such a bridge/controller will now be described with reference to FIGS. 4B to 4I. In the following description a processor I/F 414 will also be referred to as a processor port (P-port), while a storage I/F 416 will also be referred to as a storage port (S-port).

Figure 4B:
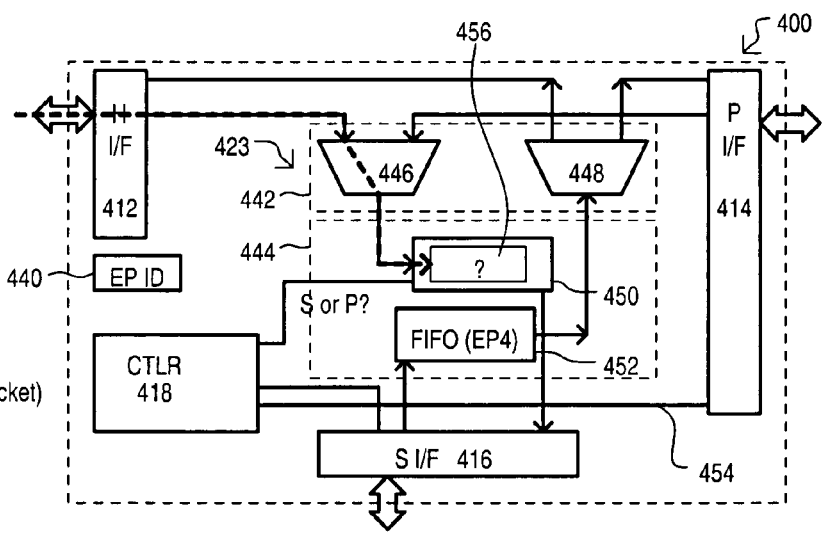

Referring to FIG. 4B, a bridge/controller 400 can receive an OUT packet 456 from host I/F 412, which can be stored in first endpoint buffer 450. Because the type of packet (e.g., data or control) is not immediately known, such a packet has a label "?". Once the OUT packet 456 has been received, a first endpoint buffer 450 can generate an interrupt for controller circuit 418. In response to the interrupt, controller circuit 418 can access endpoint indicator 440 to determine if the OUT packet 456 is for a valid endpoint (in this case endpoint "2" or EP2). If the packet is for EP2, controller circuit 418 can read a predetermined portion of OUT packet 456 which can indicate the type of packet. More particularly, if such read data indicates a control packet, the packet's appropriate destination is P-port 414. However, if the read data indicates a data packet, the packet's appropriate destination is S-port 416.

Figure 4C:
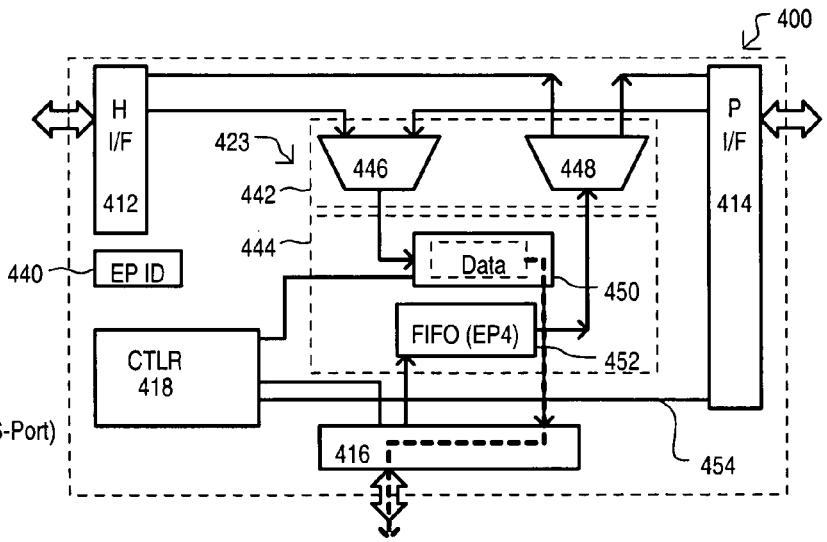

The operation of a bridge/controller 400 in response to an S-port OUT packet is shown in FIG. 4C.

Referring to FIG. 4C, upon determining that a received packet is a data packet, a controller circuit 418 can automatically output data from first endpoint buffer 450 to S-port 416. More particularly, a controller circuit 418 can receive, or can have previously received, file attribute data for a transfer operation as well as an indication of when a file transfer is to start. Such file attribute data can indicate how much data is to be transferred (e.g., number of bytes and/or number of packets), and where such data is to be transferred (e.g., physical addresses of a storage device accessed by S-port 416). According to such attribute data, controller circuit 418 can configure first endpoint buffer 450 to output data until an entire file has been received and output to S-port 416. At the same time, controller circuit 418 can configure S-port 416 to write data as it is received.

Once all data for a given data OUT operation has been transferred, first endpoint buffer 450 can generate an interrupt to controller circuit 418. In response to such an interrupt, controller circuit 418 can send a notification to P-port. In response to the notification, a response packet (an IN packet) can be generated by a processor connected to P-port. One example showing the generation of an IN response packet is shown in FIGS. 4D and 4E.

Figure 4D:
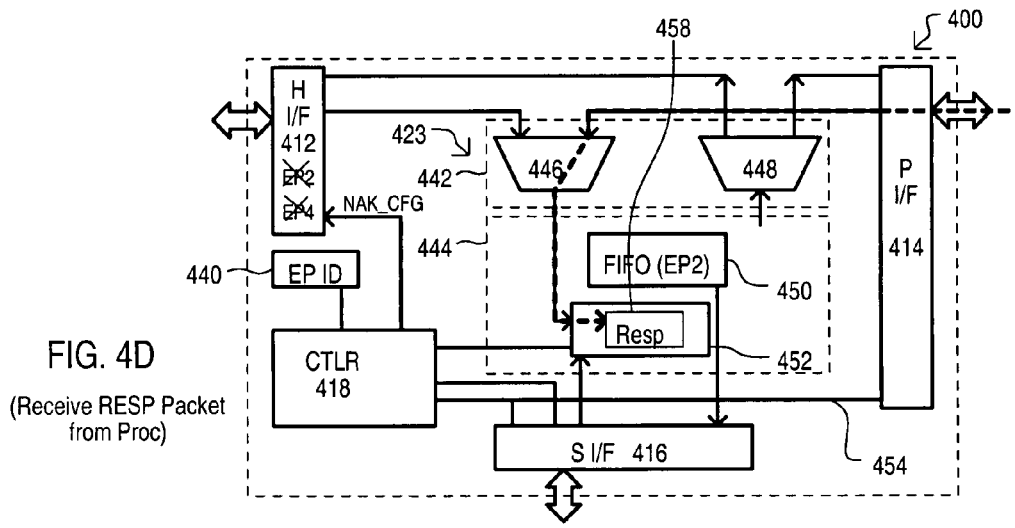

Referring to FIG. 4D, after a predetermined operation (e.g., data transfer), a response packet can be received from P-port 414. In the particular example shown, the sending of a response packet can include controller circuit 418 configuring host I/F 412 into the no acknowledgement (NAK) state. In such a state, access/inquiries directed to first and second endpoints (EP2 and EP4 in this particular example) will not be acknowledged. In addition, a second endpoint buffer 452 can be configured to the OUT direction, and MUX section 442 can be set to the processor direction. A controller circuit 418 can also store a transaction indication (e.g., toggle value) for second endpoint buffer 452. Controller circuit 418 can then indicate to a processor, via communication path 454, that a packet can be written. Such a processor can then write a response packet 458 to second endpoint buffer 452.

Figure 4E:
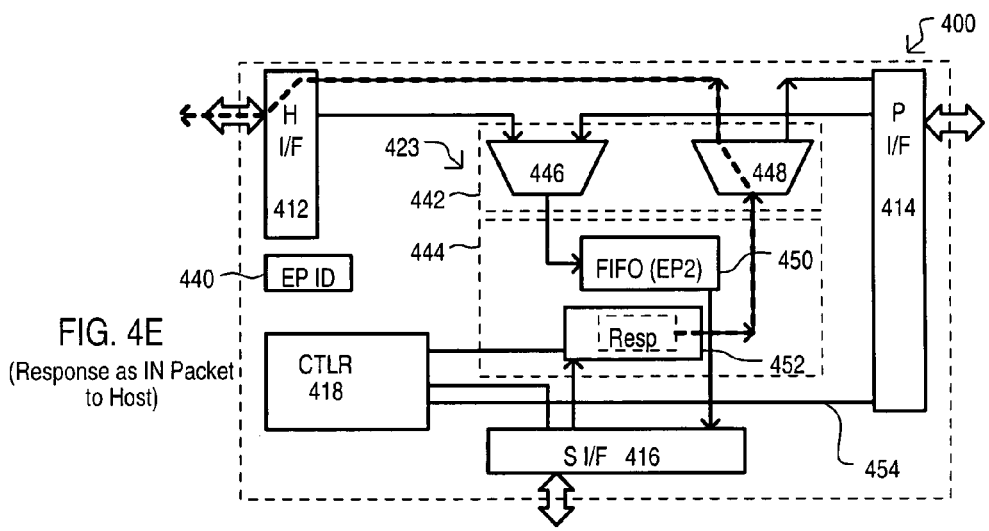

Referring to FIG. 4E, after a processor completes the writing of a response packet to second endpoint buffer 452, second endpoint buffer 452 can generate an interrupt for control circuit 418. In response to such an interrupt, control circuit 418 can configure second endpoint buffer 452 into the IN direction, restore the toggle value for the second endpoint buffer 452, and switch MUX section 442 back to the host direction. Further, controller circuit 418 can restore host I/F 412 to an acknowledging state. A host can then read the response packet via host I/F 412.

Referring back to FIG. 4B, it will be recalled that a bridge/controller 400 can provide a different configuration depending upon whether a received OUT packet was for an S-port 416 or a P-port 414. One example of the operation of a bridge/controller 400 in response to an S-port OUT packet was shown in FIG. 4C. An example of the operation of a bridge/controller 400 in response to a P-port OUT packet will now be described with reference to FIG. 4F.

Figure 4F:
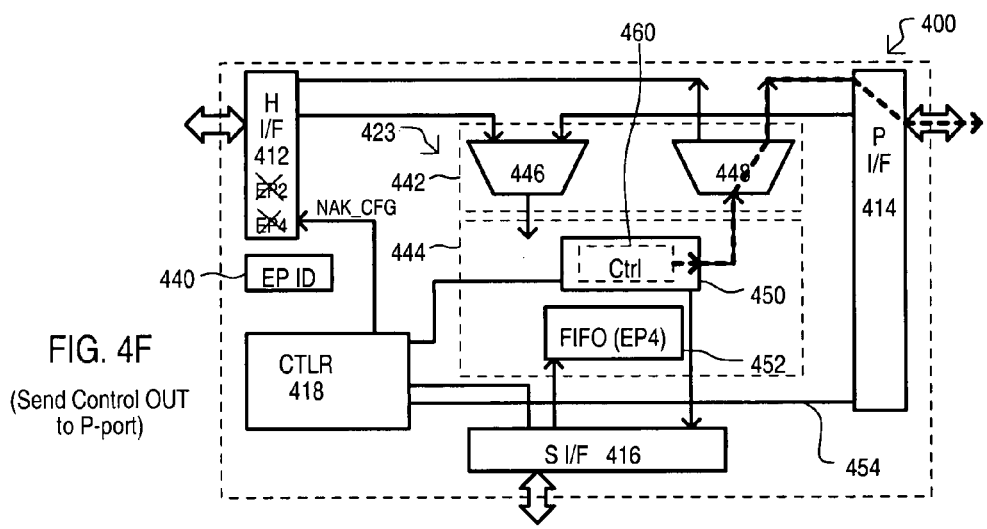

Referring to FIG. 4F, upon determining that a received OUT packet stored within a first endpoint buffer 450 is a control packet 460, a controller circuit 418 can send such a packet to P-port 414. In the particular example shown, the sending of such a control packet can include controller circuit 418 configuring host I/F 412 into the no acknowledgement (NAK) state. A controller circuit 418 can then store a transaction indication (e.g., toggle value) for first endpoint buffer 450. First endpoint buffer 450 can be configured to the IN direction, and MUX section 442 can be set to the processor direction. Controller circuit 418 can then indicate to a processor, via communication path 454, that a packet is ready to be read. Such a processor can then read the control packet 460 from first endpoint buffer 450. Following such an operation, a bridge/controller 400 can return to the original state as shown in FIG. 4A.

While FIGS. 4B to 4F have illustrated configurations for data and control IN packets, a bridge/controller 400 can also be configured for data OUT packets.

Figure 4G:
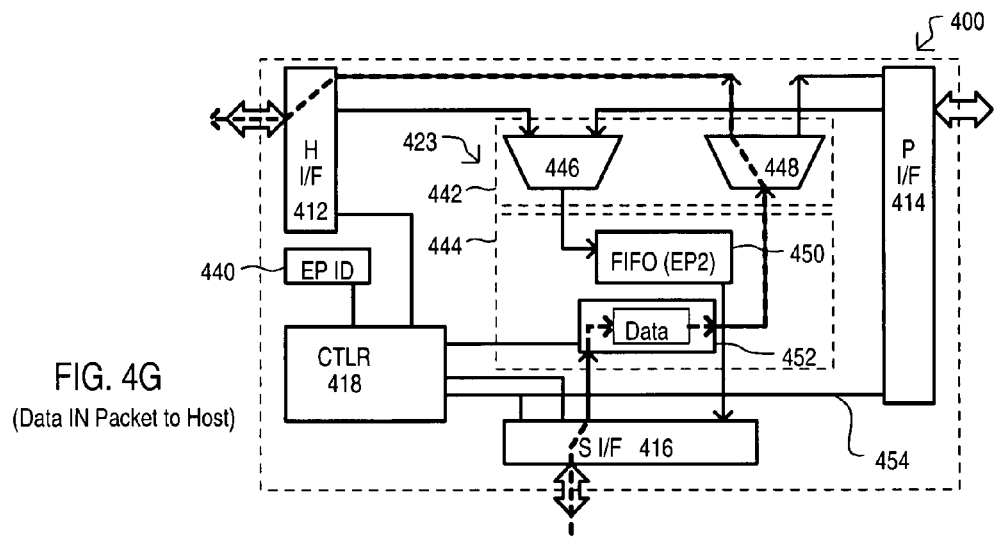

Referring to FIG. 4G, in response to predetermined instructions from a processor, data can be automatically read from S-port 416 to a second endpoint buffer 452. More particularly, a controller circuit 418 can receive, or can have previously received, file attribute data for a transfer operation as well as an indication of when a file transfer is to start. Like the OUT data packet operation like that shown in FIG. 4C, such file attribute data can indicate how much data is to be transferred (e.g., number of bytes and/or number of packets), and can also include where such data is presently stored (e.g., physical addresses of a storage device accessed by S-port). According to such attribute data, controller circuit 418 can configure S-port 416 to read such data to second endpoint buffer 452. At the same time, a host can read data from second endpoint buffer until an entire file has been read. Once all data for a given operation has been transferred, a response packet (an IN packet) can be generated as described with reference to FIGS. 4D and 4E.

FIGS. 4B and 4F show one example of how a control data path can be created. In particular, FIG. 4B shows how an OUT packet can be received and examined, and FIG. 4F shows how once an OUT packet is determined to be a control packet, it can be output by switching a direction of first endpoint buffer 450 and MUX section 442. However, the structure illustrated in FIGS. 4A to 4I can provide such a data path in an alternate fashion. Such an alternate control data path is shown in FIGS. 4H and 4I.

Figure 4H:
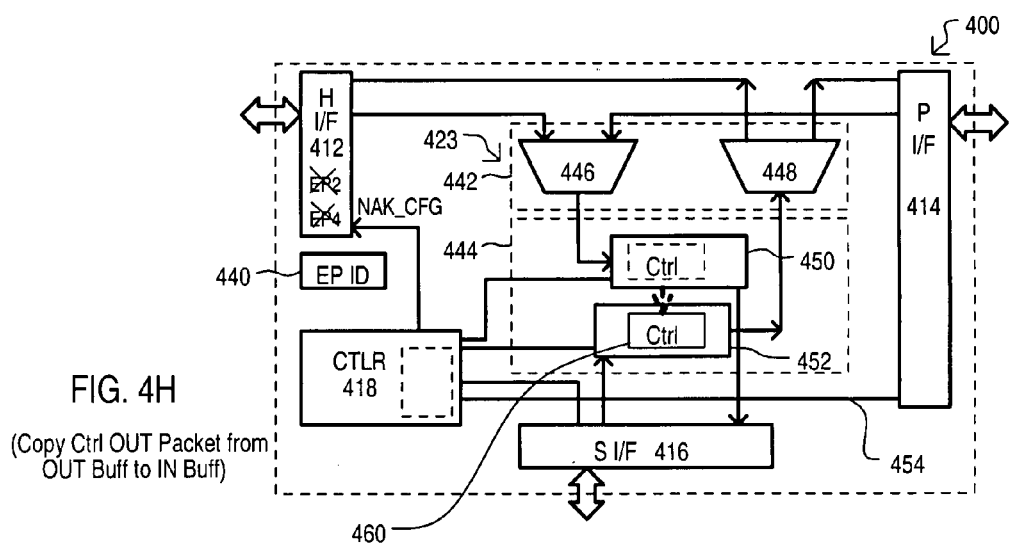

Referring to FIG. 4H, upon determining that a received OUT packet within a first endpoint buffer 450 is a control packet 460, a controller circuit 418 can configure host I/F 412 into the no acknowledgement (NAK) state, store transaction indications (e.g., toggle values) for first and second endpoint buffers 450 and 452. Second endpoint buffer 452 can be configured to the IN direction, and MUX section 442 can be set to the processor direction. Controller circuit 418 can then copy the control packet 460 from first endpoint buffer 450 to second endpoint buffer 452.

Figure 4I:
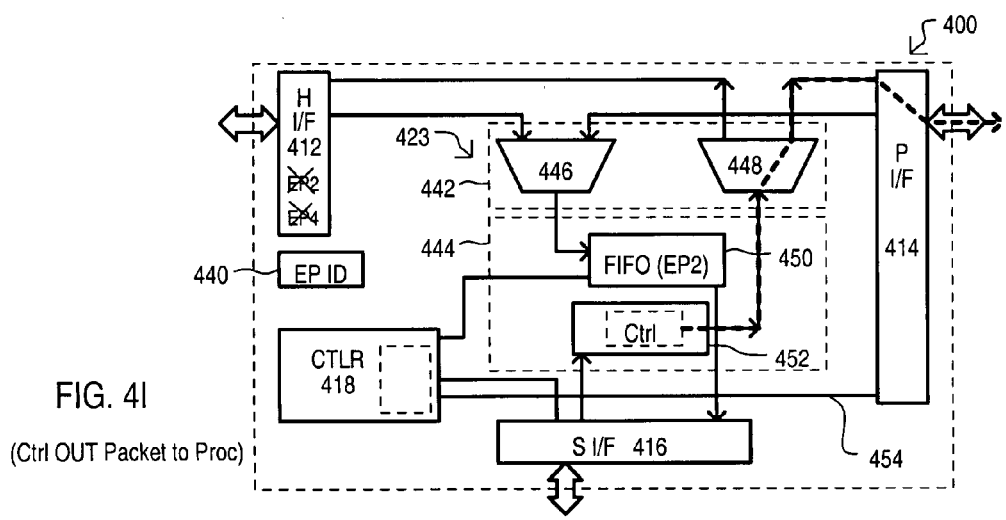

Referring to FIG. 4I, once control packet 460 has been copied to second endpoint buffer 452, controller circuit 418 can switch MUX section 442 to the processor direction. Controller circuit 418 can then indicate to a processor, via communication path 454, that a packet is ready to be read. Such a processor can then read the control packet 460 from second endpoint buffer 452. Following such an operation, a bridge/controller 400 can return to the original state shown in FIG. 4A.

In this way, a control data path can be provided by copying a packet from one buffer to another, and then switching an output MUX direction. This type of operation can be less effective in data throughput than the approach shown by FIGS. 4B and 4F.

While the embodiments have shown systems and bridge/controllers that can be included in such systems, the present invention can also include machine readable instructions executed by a controller circuit. One such embodiment is shown in FIGS. 5A to 5C. FIGS. 5A to 5C show instructions and operations executable by a microcontroller that can serve as a controller circuit in any of the embodiments described herein. The general flow is described in "pseudocode" form, which can be equivalently represented by those skilled in the art into a suitable instruction set for execution by a processor. Preferably, such instructions are firmware for a microcontroller.

FIG. 5A shows a series of instructions that can be included in a main routine. FIGS. 5B and 5C show subroutines SUB1 and SUB2 that can be called by the main routine of FIG. 5A.

Referring to FIG. 5A, lines 1-4 show steps to establish an initial configuration, like that shown in FIG. 4A. Lines 5-19 show steps for a request "SendFileData" which can perform operations like those shown in FIGS. 4B to 4E. Lines 20-34 show steps for a request "GetFileID" which can perform operations like those shown in FIGS. 4B, 4F and 4G.

In this way, a set of instructions can create configurable data paths for fast data transfer from a host device to a storage device.

The present invention can also includes a method of transferring a file, such as a media file, from a host device to a secondary device. Such a method can take the form of a communication protocol for execution between a host device and a secondary device that includes a storage device. Such a protocol is shown in FIGS. 6A to 6I.

FIGS. 6A to 6I show a system in a block diagram and designated by the general reference character 600. System 600 can include a host device 602 and a secondary device 604. A secondary device 604 can be connected to a host device 602 by a communication path 606, which can be a wired path or a wireless path. A secondary device 604 can include a device processor 606, a bridge/controller 608, and a storage device 610. A device processor 606 can include a file system 612 that can organize files stored within storage device 610.

In very particular arrangements, FIGS. 6A to 6I can be considered related to the above embodiments, as a system 600 can be one version of the system shown in FIG. 1, and bridge/controller 608 can include any of the bridge/controllers shown herein and equivalents.

FIGS. 6A to 6I show a protocol that includes three phases, a request phase, a transfer phase, and an acknowledgement phase. In a request phase, a host device 602 can issue a request to a secondary device 604. In a transfer phase, data can be transferred between host device 602 and secondary device 604. In an acknowledgement phase, a secondary device 604 can generate a response indicating the results of the requested operation.

Figure 6C:
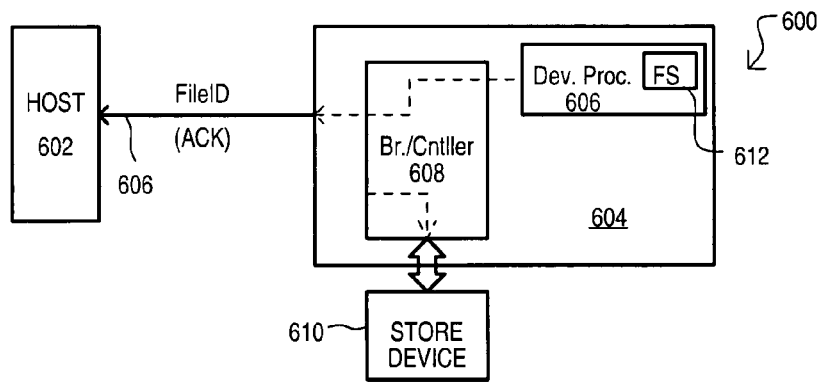

FIGS. 6A to 6C show the execution of a "SendFileInfo" operation by system 600 according to a three phase protocol. Such a request can provide file information to a secondary device 604.

FIG. 6A shows a system 600 in a request phase of a "SendFileInfo" operation. A host device 602 issues a SendFileInfo request to a secondary device 604. Bridge/controller 608 can be initially configured to pass such a request through to a device processor 606. Such a request can indicate to a device processor 606 that file information will follow from a host device 602.

FIG. 6B shows system 600 in a transfer phase of a "SendFileInfo" operation. A host device 602 can send file attribute data to secondary device 604. As but one example, such data can include a file name, file size, and other information for organizing the file in a file system (e.g., target folder). Bridge/controller 608 can pass such data to a device processor 606. In response to such data, a device processor 606 can confirm a file corresponding to the file data can be stored (i.e., secondary device meets the parameters necessary to store the file). Device processor 606 can then issue commands to configure bridge/controller 608 to provide a direct path for subsequently transmitted data. For example, bridge/controller 608 can be configured to monitor a received packet to determine if it is a data or control packet, as noted above.

FIG. 6C shows system 600 in an acknowledgement phase of a "SendFileInfo" operation. A device processor 606 can generate a response indicating the status of the request. For example, in the case of the "SendFileInfo" request, such a response can indicate whether or not the data for the file was completely received, or if the file system indicates the file can be accommodated, etc. If secondary device 604 can accommodate the identified file, such an acknowledgement can include a file identifier (e.g., FileID).

Figure 6D:
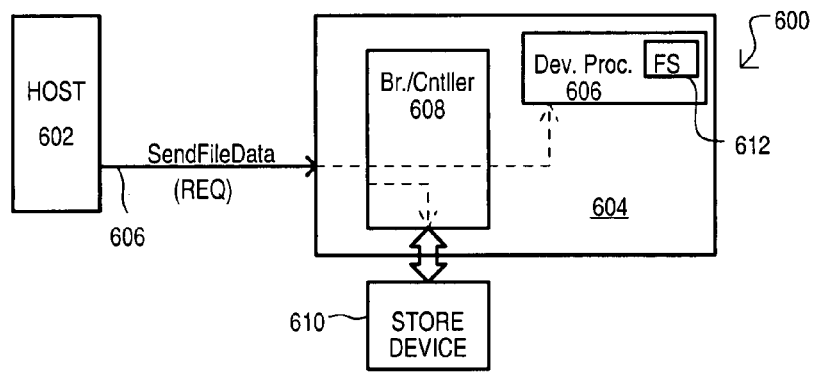
Figure 6E:
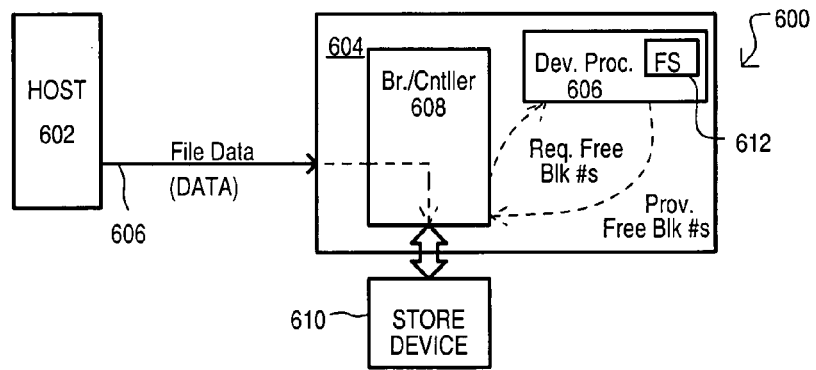
Figure 6F:
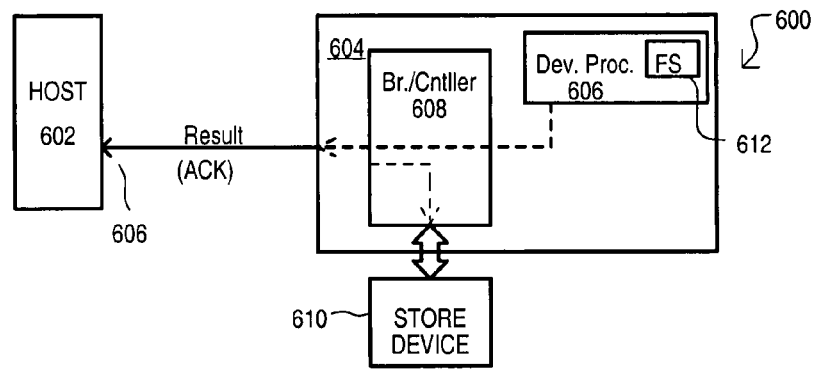

FIGS. 6D to 6F show the execution of a "SendFile" request by system 600 according to a three phase protocol. Such a request can send a file from a host device to a secondary device.

FIG. 6D shows a system 600 in a request phase of a "SendFileData" operation. A host device 602 issues a SendFile request to a secondary device 604. A bridge/controller 608 can be configured to examine such a request and forward it as control data to a device processor 606. In response to such a packet, a device processor can issue information to a bridge/controller 608. For example, a device processor 606 can indicate when file data will be sent.

FIG. 6E shows system 600 in a data phase of a "SendFileData" operation. A host device 602 can send file data to secondary device 604. Bridge/controller 608 can pass such data to storage device 610, bypassing device processor 606. In one particular arrangement, in such an operation, a bridge/controller 608 can request block numbers of locations within a storage device 610 from device processor 606. Device processor 606 can provide such blocks, as determined by a file system accessible by device processor 606.

FIG. 6F shows system 600 in an acknowledgement phase of a "SendFileData" operation. In response to bridge/controller 608 indicating whether or not a data transfer was successful, a device processor 606 can generate a response indicating the status of the request. For example, such an acknowledgement can indicate the file was safely transferred, etc.

Figure 6G:
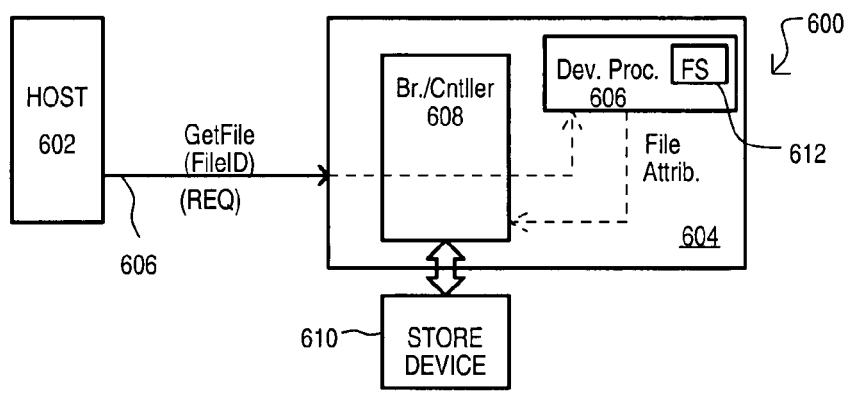
Figure 6H:
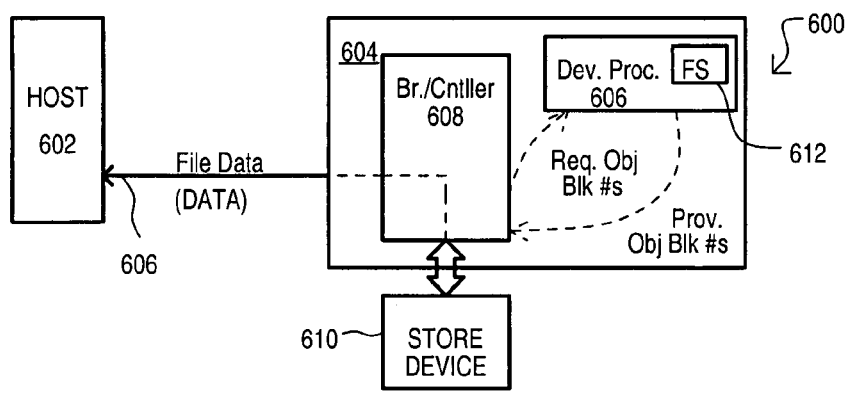
Figure 6I:
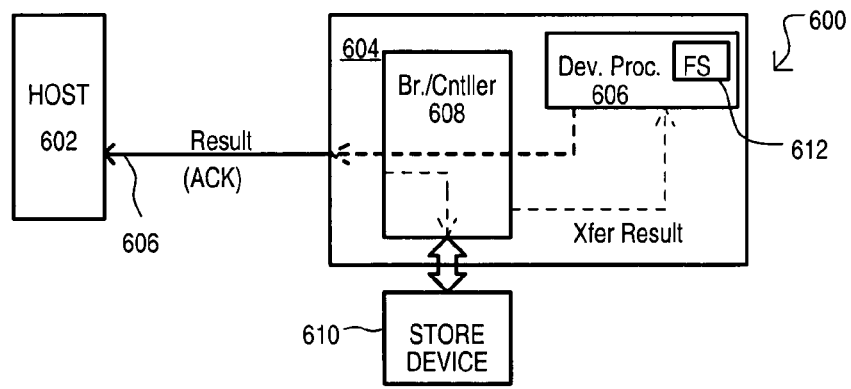

FIGS. 6G to 6I show the execution of a "GetFile" operation by system 600 according to a three phase protocol. Such a request can have a host device retrieve a file from a secondary device.

FIG. 6G shows a system 600 in a request phase of a "GetFile" operation. A host device 602 issues a GetFile request to a secondary device 604. Such a request can include a file identifier (i.e., file name, object "handle", or other file identifier). A bridge/controller 608 can be configured to examine such a request and forward it as a control data to a device processor 606. A device processor 606 can determine a location for the requested file (or determine such a file is not stored on secondary device 604). In one arrangement, a device processor 606 can also indicate when a data transfer operation is to start.

FIG. 6H shows system 600 in a data phase of a "GetFile" operation. Bridge/controller 608 can request storage locations for the requested file, and read data from such locations, and output such data to a host device 602. Such an operation can bypass device processor 606.

FIG. 6I shows system 600 in an acknowledgement phase of a "SendFile" operation. In response to an indication from bridge/controller 608 indicating whether or not a data transfer was successful, a device processor 606 can generate a response packet indicating the status of the request.

The above three phase protocol arrangement can be modified to accommodate various particular data transfer conventions. As but one example, in other conventions, an acknowledgement phase can be a "response phase". That is, the invention can be incorporated for use in any compatible file transfer protocol, preferably those protocols involving media files, including but not limited to video and music files.

In this way, a system can transfer data files between a host device and secondary device with a three phase protocol, where data can be transferred by a path that does not include a device processor.

Figure 7A:
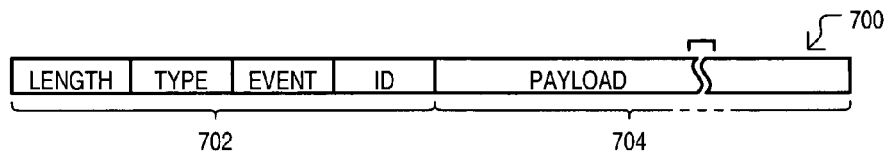
FIGS. 7A to 7C show the processing of one type of data container according to an embodiment of the invention.
Figure 7B:
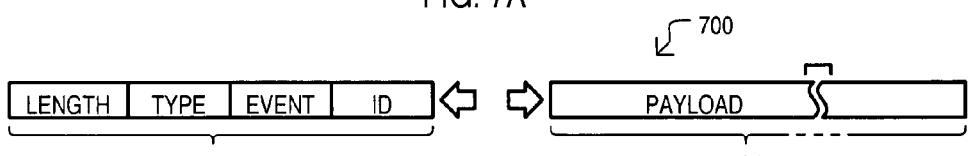
Figure 7C:
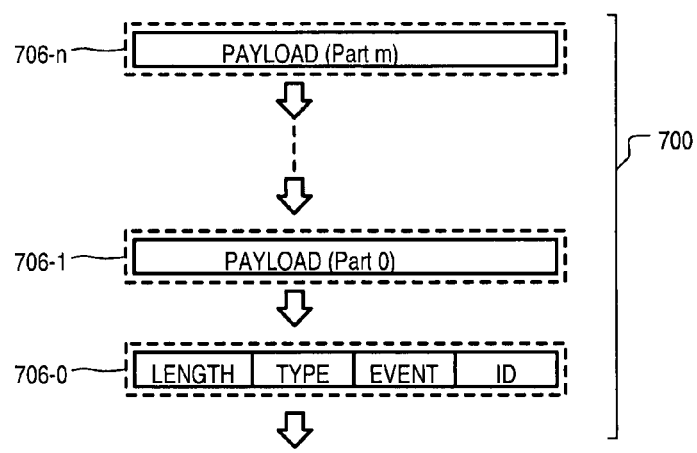

FIGS. 7A to 7C show one very particular approach to implementing the transfer of data having a particular format.

FIG. 7A shows a data "container" 700. A data container 700 can define the format data must take in a given operation. A data container 700 can be conceptualized as including a header portion 702 and a payload portion 704. More particularly, data container 700 can show how data is formatted in each phase of a three phase protocol, like that shown in FIGS. 6A to 6I. In an even more particular arrangement, FIG. 7A can show a data capsule according to International Standards Organization (ISO) 15740. However, the present invention should not be construed as being limited to any particular protocol, or data format.

A header portion 702 can contain information about the data transmission, while a payload portion 704 can include data to be included in an operation (e.g., stored). Thus, a payload portion 704 can be optional. In the very particular example shown, a header portion 702 can include a LENGTH field that can indicate the total amount of data being sent (e.g., header+payload), a TYPE field that can indicate type of container (e.g., request, data, response), an EVENT field that can indicate a particular type of operation being executed, and an ID field that can indicate where in sequence of transmissions the present data is occurring.

FIGS. 7B and 7C show a logical operation that can be executed on a data container 700 according to an embodiment of the invention. FIG. 7B shows how a header portion 702 can be split off from a payload portion 704.

FIG. 7C shows how data container 700 can be transmitted as an initial packet 706-0, that only includes a header portion 704, and one or more follow on packets 706-1 to 706-*n* for any corresponding payload. As but one particular example, an initial packet 706-0 can be received by a bridge/controller according to any of the described embodiments, or equivalents. Such a bridge/controller can determine the packet is a data packet (i.e., by field TYPE and/or EVENT), and configure itself to automatically store subsequently transmitted packets 706-1 to 706-*n* at suitable locations in a storage device.

In this way, a data capsule having a header can be separated into a header only portion and one or more following data portions.

Figure 8:
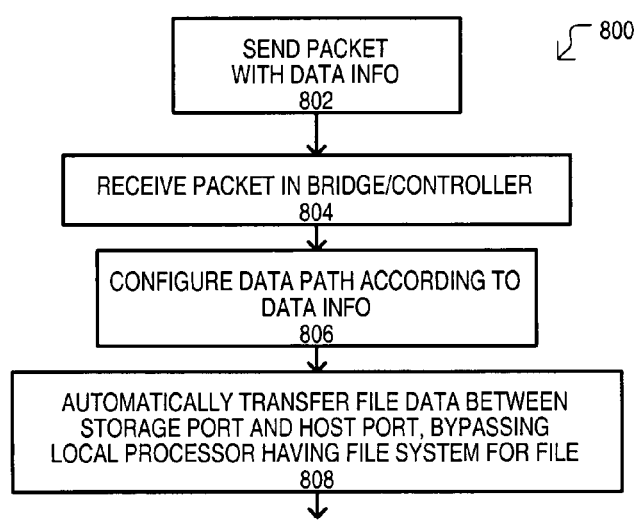
FIG. 8 is a flow diagram of a method according to an embodiment.

Referring now to FIG. 8, a method according to an embodiment is shown in a flow diagram and designated by the general reference character 800. A method 800 can include sending a packet with data information (step 802). Such a packet can be received by a bridge/controller (step 804). A data path can then be configured based on such data information (step 806). File data can then be automatically transferred between a storage port and a host port, bypassing a local processor that includes a file system for the file (step 808).

In this way, a method can transfer data between a host device and a secondary device by configuring a data path in the secondary device that bypasses a local processor of the secondary device.

While some embodiments of the present invention can be represented by block diagrams and flow diagrams, other embodiments can be represented with a state diagram. One example of such a state machine is shown in FIG. 9.

Figure 9:
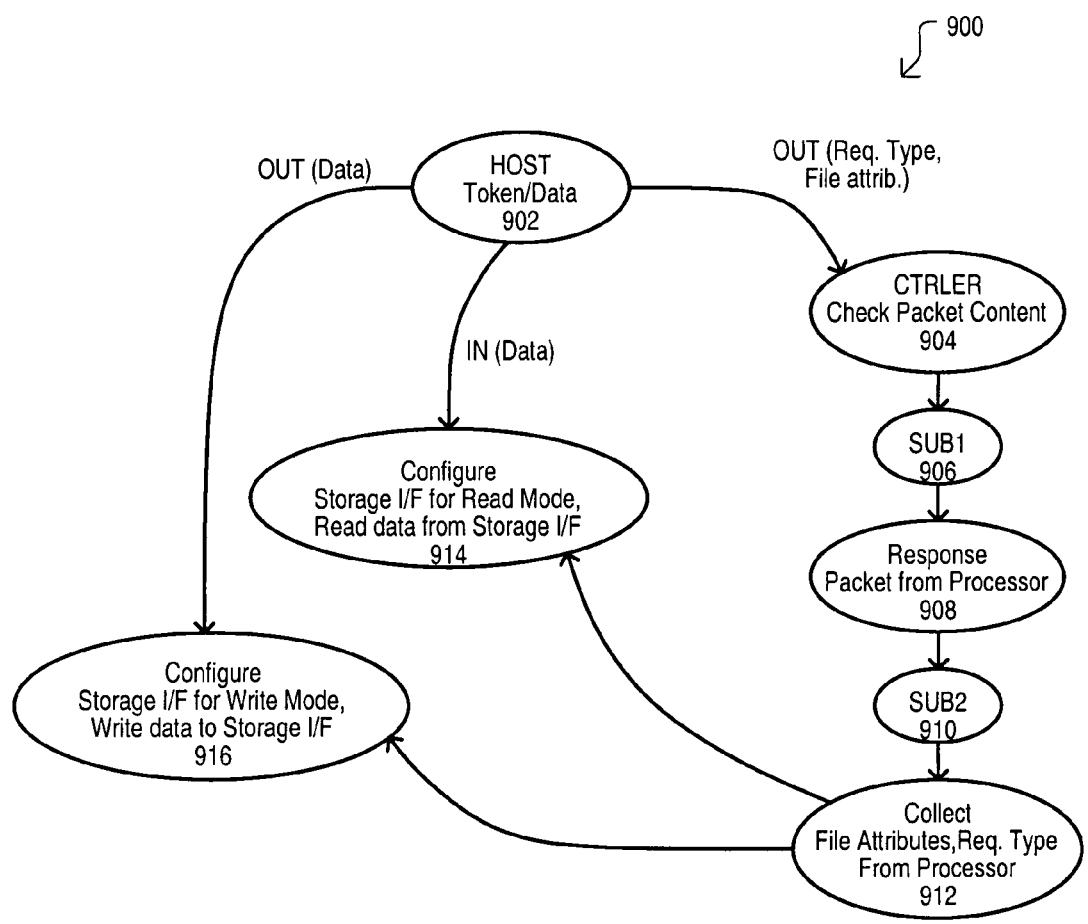
FIG. 9 is state diagram showing file transfer operations according to another embedment.

FIG. 9 shows a state diagram designated by the general reference character 900. A state diagram 900 can include a host executing IN and OUT type operations (902). If an OUT type operation is a request type operation, a controller can receive and check the content of a packet (904). A controller can then execute an operation like that described in subroutine SUB1 of FIG. 5B (906) (e.g., transfer such a packet to a processor). A processor can return a response packet (908). A controller can then execute an operation like that described in subroutine SUB2 of FIG. 5C (910) (e.g., transfer such a packet to a host). A controller can also receive attribute values for a data file sent in the request (step 912).

Referring still to FIG. 9, once a controller has file attribute data, if a host sends an IN data packet, a controller can configure a storage interface to read data from a storage device, and data can be read from the storage I/F (914) by a host. If a host sends an OUT data packet, a controller can configure a storage interface to write data to a storage device, and data received from a host can be written by storage I/F (916) into some storage media.

In this way, data transfer operations can be executed between a host device and a secondary device having a controller, storage I/F, and processor with a file system.

Embodiments of the present invention can be well suited to performing various other steps or variations of the steps recited herein, and in a sequence other than that depicted and/or described herein.

For purposes of clarity, many of the details of the various embodiments and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A system for transferring data files between a host device and a secondary device, comprising:
   a bridge device forming at least a portion of the secondary device, the bridge device including
   a de-multiplex (de-MUX) data path with an input coupled to a host interface (I/F), a first output coupled to a storage I/F and a second output coupled to a processor I/F, and
   a controller circuit having at least control inputs coupled to receive configuration commands from the processor I/F and control outputs coupled to the de-MUX data path, the controller circuit enabling and maintaining a data path between the host I/F and the first output of the de-MUX data path for a predetermined number of data transfers in response to at least a first configuration data input.

2. The system of claim 1, further including:
   at least a first buffer circuit having locations for storing data values, the at least first buffer being coupled to the de-MUX path and
   a first interface circuit coupled to the first buffer circuit that selectively provides an input path between the host I/F and the first buffer circuit.

3. The system of claim 2, wherein:
   the first buffer circuit comprises a first-in-first-out memory.

4. The system of claim 1, wherein:
   the bridge device further includes
   a multiplex (MUX) data path with an output coupled to the host I/F, a first input coupled to the storage I/F and a second input coupled to the processor I/F, and
   the controller circuit further having control outputs coupled to the MUX data path, the controller circuit enabling and maintaining a data path between the host I/F and the first input of the MUX data path for a predetermined number of data transfers in response to a second configuration data input.

5. The system of claim 4, further including:
   at least a second buffer circuit having locations for storing data values, the at least second buffer circuit being coupled to the MUX data path, and
   a second interface circuit coupled to the second buffer circuit that selectively provides an output path between the storage I/F and the second buffer circuit.

6. The system of claim 1, wherein:
   the controller circuit further comprises a plurality of registers, and
   the de-MUX data path is coupled to receive configuration data from at least one of the registers.

7. The system of claim 1, wherein:
   the host I/F comprises a serial interface circuit that receives data in a serial format and outputs such data in parallel; and
   the processor I/F comprises a parallel interface circuit that input and outputs data values in parallel.

8. A system for transferring data files between a host device and a secondary device, the system comprising:
   the secondary device comprising,
   a bridge device coupled between a processor interface (I/F), a storage I/F and a host I/F, the bridge device configurable to provide a control path between the host I/F and the processor and a data path between the host I/F and the storage I/F in response to at least one predetermined command from the processor I/F, the data path bypassing the processor I/F, the bridge device also being coupled to receive file system information from the processor I/F, the file system information organizing data files accessed via the storage I/F.

9. The system of claim 8, wherein:
   bridge device comprises
   an input de-multiplexer (de-MUX) path having at least a first input coupled to the host I/F, and
   an output multiplexer (MUX) path having at least a first output coupled to the host I/F.

10. The system of claim 9, wherein:
    the input de-MUX path further includes a second output coupled to the processor and first output coupled to the storage I/F, and
    the output MUX path further includes a second input coupled to the processor and first input coupled to the storage I/F.

11. The system of claim 10, wherein:
    the bridge device further includes a buffer circuit coupled between the host I/F and the input de-MUX path.

12. The system of claim 10, further including:
    a processor coupled to the processor I/F configured to directly access a file system that organizes data files accessed via the storage interface (I/F).

13. The system of claim 12, including:
    at least one storage device coupled to the storage I/F, wherein the storage I/F is configurable to automatically transfer data from the bridge device to the at least one storage device without storing the data at any memory location of the processor.

14. A method of transferring data between a host device and a secondary device, the method comprising:
  in response to a predetermined command received by a bridge device of the secondary device, from a processor interface (I/F), using a controller circuit of the bridge device:
    providing a control path to transfer control information from a host I/F to a processor I/F; and
    enabling and maintaining a data path between the host I/F and a first output of a de-MUX data path for a predetermined number of data transfers to transfer data from the host I/F to a storage I/F, the data path bypassing the processor I/F; and
  receiving file system information from the processor I/F, the file system information organizing data files accessed via the storage I/F.

15. The method of claim 14, wherein:
the predetermined command is a data phase of a three phase protocol that includes an operation request phase, a data transfer phase, and an operation acknowledgement phase.

16. The method of claim 15, wherein:
in the data transfer phase of the protocol
  data payload information is transmitted in a first packet and the data payload is transmitted in at least one subsequently transmitted packet.

17. The method of claim 14, wherein:
the using of the controller circuit of the bridge device to provide the control path and the data path includes receiving control information from the processor I/F indicating a configuration of at least the data path.

18. The method of claim 14, further including:
the secondary device includes at least one data endpoint that indicates at least a logical destination for data received by the secondary device; and
not acknowledging host device accesses to the at least one endpoint while a processor accesses the at least one endpoint via the processor I/F.

19. The method of claim 14, further including:
storing packet data received from the host device in a first endpoint buffer;
in a first configuration, transferring the packet data to the processor I/F via a first route of an input de-MUX path; and
in a second configuration resulting from the predetermined command, transferring the packet data to the storage I/F via a second route of the input de-MUX path.

20. The method of claim 19, further including:
in the first configuration, transferring packet data received from the processor I/F via a first route of an output MUX into a second endpoint buffer; and
in the second configuration resulting from the predetermined command, transferring packet data received from the storage I/F via a second route of the output MUX into the second endpoint buffer.

* * * * *